United States Patent
Zhang et al.

(10) Patent No.: US 10,841,058 B2
(45) Date of Patent: Nov. 17, 2020

(54) METHOD AND DEVICE FOR NOTIFYING AND DETERMINING DMRS PORTS OR MAPPING RELATIONSHIP

(71) Applicant: ZTE Corporation, Shenzhen (CN)

(72) Inventors: Shujuan Zhang, Shenzhen (CN); Yijian Chen, Shenzhen (CN); Yu Ngok Li, Shenzhen (CN); Wenhao Liu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 120 days.

(21) Appl. No.: 15/752,477

(22) PCT Filed: Aug. 1, 2016

(86) PCT No.: PCT/CN2016/092691
§ 371 (c)(1),
(2) Date: Feb. 13, 2018

(87) PCT Pub. No.: WO2017/028673
PCT Pub. Date: Feb. 23, 2017

(65) Prior Publication Data
US 2019/0013910 A1    Jan. 10, 2019

(30) Foreign Application Priority Data

Aug. 14, 2015   (CN) .......................... 2015 1 0502491
Sep. 25, 2015   (CN) .......................... 2015 1 0626635

(51) Int. Cl.
*H04L 5/00*   (2006.01)
*H04W 72/04*  (2009.01)
(Continued)

(52) U.S. Cl.
CPC ......... *H04L 5/0048* (2013.01); *H04B 7/0452* (2013.01); *H04L 1/1812* (2013.01);
(Continued)

(58) Field of Classification Search
None
See application file for complete search history.

(56) References Cited

U.S. PATENT DOCUMENTS

2013/0265951 A1   10/2013   Ng et al.
2014/0293881 A1   10/2014   Khoshnevis et al.
(Continued)

FOREIGN PATENT DOCUMENTS

CN   101932096 A   12/2010
CN   102082595 A    6/2011
(Continued)

OTHER PUBLICATIONS

International Serach Report Application No. PCT/CN2016/092691; Dated Oct. 21, 2016; pp. 4.

*Primary Examiner* — Alex Skripnikov
(74) *Attorney, Agent, or Firm* — Cantor Colburn LLP

(57) ABSTRACT

A method and device for notifying and determining DMRS ports or a mapping relationship is provided. The method includes a sending end sending indication information to a receiving end in a TM, and the sending end indicates allocation information about DMRS ports or a mapping relationship according to the indication information, and the indication information includes at least one of the following: RRC signaling, physical layer NDI bit, and DMRS pilot scrambler configuration information $n_{scid}$. A problem of influence on a performance of a MU-MIMO system caused by lower channel estimation performance due to limited
(Continued)

A receiving end receives a notification message sent by a sending end in a TM, and the receiving end selects a mapping relationship from multiple mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information: high-layer signaling; an NDI of a transmission block; a redundancy version of a transmission block; at least one bit in an HARQ process number bit field; and at least one bit in an MCS bit field of a transmission block — S402 orthogonal DMRS ports for MU-MIMO transmission and high MUI after increment of a total number of MU-MIMO transmission layers is solved.

18 Claims, 2 Drawing Sheets

(51) Int. Cl.
    *H04B 7/0452* (2017.01)
    *H04L 1/18* (2006.01)
    *H04W 76/27* (2018.01)
    *H04L 1/00* (2006.01)

(52) U.S. Cl.
    CPC .......... *H04L 1/1896* (2013.01); *H04L 5/0051* (2013.01); *H04W 72/042* (2013.01); *H04L 1/0068* (2013.01); *H04L 5/0044* (2013.01); *H04L 5/0094* (2013.01); *H04W 76/27* (2018.02)

(56) References Cited

U.S. PATENT DOCUMENTS

| | | | |
|---|---|---|---|
| 2015/0263796 A1* | 9/2015 | Nam | H04B 7/0417 370/329 |
| 2016/0212752 A1* | 7/2016 | Xu | H04W 72/08 |
| 2017/0005764 A1* | 1/2017 | Park | H04J 11/005 |

FOREIGN PATENT DOCUMENTS

| | | |
|---|---|---|
| CN | 102111893 A | 6/2011 |
| CN | 102158302 A | 8/2011 |
| CN | 102447524 A | 5/2012 |
| CN | 102598526 A | 7/2012 |

\* cited by examiner

A sending end sends indication information to a receiving end in a TM, and the sending end indicates allocation information about DMRS ports according to the indication information, and the indication information includes at least one of the following: RRC signaling, physical layer NDI bit, and DMRS pilot scrambler configuration information $n_{scid}$ — S102

Fig. 1

A sending end sends a notification message to a receiving end in a TM, and the notification message is used for notifying the receiving end to select a mapping relationship from a plurality of mapping relationships, and the mapping relationship refers to a mapping relationship between a joint coding field value set and a joint coding content set, and a method for sending the notification message includes at least one of the following manners: notification via high-layer signaling; notification via an NDI of a transmission block; notification via a redundancy version of a transmission block; notification via at least one bit in an HARQ process number bit field; and notification via at least one bit in an MCS bit field of a transmission block — S202

Fig. 2

A receiving end receives indication information sent by a sending end in a TM, and the receiving end determines, according to the indication information, DMRS ports for data demodulation of the receiving end at a current subframe. The indication information includes at least one of the following: RRC signaling, physical layer NDI bit, and DMRS pilot scrambler configuration information $n_{scid}$ — S302

Fig. 3

A receiving end receives a notification message sent by a sending end in a TM, and the receiving end selects a mapping relationship from multiple mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information: high-layer signaling; an NDI of a transmission block; a redundancy version of a transmission block; at least one bit in an HARQ process number bit field; and at least one bit in an MCS bit field of a transmission block — S402

Fig. 4

First sending component 52

Fig. 5

Second sending component 62

Fig. 6

First receiving component 72

Fig. 7

Second receiving component 82

Fig. 8

METHOD AND DEVICE FOR NOTIFYING AND DETERMINING DMRS PORTS OR MAPPING RELATIONSHIP

TECHNICAL FIELD

The present disclosure relates to the field of communications, and in particular to a method and device for notifying and determining Demodulation Reference Signal (DMRS) ports or a mapping relationship.

BACKGROUND

As communication technology and electronic technology develop rapidly, the number of antennae at the base station end is increasing. For example, in Full-dimension-Multiple-Input Multiple-Output (FD-MIMO) and high-frequency communications, the number of antennae at the base station end has increased from 8 to 16, 32, 64 or more. In this case, due to a cost problem of at least one receiving end, a number of antennae is not multiplied. Meanwhile, many older-version receiving ends, with few antennae, are present under a multi-antenna base station. If the number of receiving ends for Multi-User Multiple-Input Multiple-Output (MU-MIMO) is not synchronously increased, the performance advantage of greatly increasing the antennae of the base station end cannot be fully employed. In order to fully employ the multi-antenna performance potential of the base station end and to increase system capacity, it is necessary to increase the number of receiving ends and the number of layers for MU-MIMO communications.

With an increment of the number of receiving ends in MU-MIMO, a total number of sending layers of the at least one base station end is increased. Meanwhile, due to the feedback delay and error at the receiving ends, the at least one base station end cannot well eliminate Multi-User Interference (MUI) by space diversity completely, so as to cause relative increment of MUI of the receiving ends. As shown in Table 1, an MU-MIMO Transmission Scheme (TS) with two orthogonal layers and two pseudo-orthogonal layers is supported according to a joint coding result of layers, ports and scramblers in Table 1 in Downlink Control Information (DCI) 2C, 2D under a current LTE-Rel12.

TABLE 1

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port 7, nSCID = 0 | 0 | 2 layers, ports 7-8, nSCID = 0 |
| 1 | 1 layer, port 7, nSCID = 1 | 1 | 2 layers, ports 7-8, nSCID = 1 |
| 2 | 1 layer, port 8, nSCID = 0 | 2 | 3 layers, ports 7-9 |
| 3 | 1 layer, port 8, nSCID = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Under future FD-MIMO and high frequency, when a total number of MU-MIMO layers is greatly increased, channel estimation performance will become a main bottleneck for improvement of MU-MIMO performance. For this purpose, it is necessary to enhance DMRS ports for MU-MIMO communications. For example, more orthogonal DMRS ports are supported, thereby improving channel estimation performance, effectively inhibiting MUI, and improving a performance of an MU-MIMO system.

In order to increase orthogonal DMRS ports for MU-MIMO and to support dynamic switching of Single-User Multiple-Input Multiple-Output (SU-MIMO)/MU-MIMO, a manner of achieving this purpose is to extend the Table 1. That is, more bits are used for representing joint coding of layers, ports and scramblers. Orthogonality of DMRS ports of more MU-MIMO receiving ends is supported whilst dynamic switching of SU-MIMO or MU-MIMO is supported. In this case, because it is necessary to add one DCI mode to further add a Transmission Mode (TM), which is also called transmission scheme, when a number of bits occupied by joint coding is increased, a complexity of a terminal is improved. Moreover, multi-layer MU-MIMO transmission occupies a certain proportion in practical scenarios, the Table 1 is extended to notify at DCI in all scenarios, and DCI resources are unnecessarily wasted.

Any effective solution has not provided yet at present for a problem in the related art in which a performance of an MU-MIMO system cannot be fully played due to lower channel estimation performance caused by limited orthogonal DMRS ports for MU-MIMO transmission and high MUI after increment of a total number of MU-MIMO transmission layers.

SUMMARY

In one embodiment of the present disclosure, a method for notifying DMRS ports is provided, which includes that sending, by a sending end, indication information to a receiving end in a Transmission Mode (TM), and indicating, by the sending end, allocation information about DMRS ports according to the indication information, and the indication information includes at least one of the following: Radio Resource Control (RRC) signaling, physical layer New Data Indication (NDI) bit, and DMRS pilot scrambler configuration information $n_{scid}$.

In an exemplary embodiment, indicating, by the sending end, the allocation information about the DMRS ports according to the indication information includes: making, by the sending end, an appointment with the receiving end for N DMRS port groups, and indicating, by the sending end, allocation information about the DMRS port groups by using RRC signaling or physical layer NDI bit, and different indication information values indicated by the RRC signaling or the physical layer NDI bit corresponds to different DMRS port groups, different DMRS port sequences in the DMRS port groups correspond to different port groups, N is a positive integer greater than 1.

In an exemplary embodiment, indicating, by the sending end, the allocation information about the DMRS ports according to the indication information includes: indicating, by the sending end, port allocation information in the DMRS port groups according to physical layer port allocation signaling.

In an exemplary embodiment, indicating, by the sending end, the allocation information about the DMRS ports according to the indication information includes: notifying, by the sending end, the allocation information about the DMRS ports and other M−1 pieces of information in M information joint coding manners, and M is a positive integer, and the other M−1 pieces of information include at least one of the following: DMRS pilot scrambler configuration information $n_{scid}$, and layer indication information about the receiving end; and when a number of layers is r, making, by the sending end, an appointment with the receiving end for N different DMRS port groups corresponding to N $n_{scid}$, and r is 1 or 2, and N is a positive integer greater than 1.

In an exemplary embodiment, indicating, by the sending end, the allocation information about the DMRS ports according to the indication information includes: notifying, by the sending end, the receiving end whether a corresponding relationship between $n_{scid}$ and DMRS port groups is enabled, so as to indicate the allocation information about DMRS ports, and the indication information about whether to be enabled is notified according to at least one of the following manners: notification via high-layer signaling, notification via an NDI of a transmission block, and notification by fixed enabling, and in this case, N $n_{scid}$ values are bound with N DMRS port groups during joint coding, and N is a positive integer greater than 1; and when the corresponding relationship between the $n_{scid}$ and the DMRS port groups is enabled, N $n_{scid}$ values correspond to N DMRS port groups, and when the corresponding relationship between the $n_{scid}$ and the DMRS port groups is not enabled, the $n_{scid}$ does not correspond to the DMRS port groups.

In an exemplary embodiment, when the corresponding relationship between the $n_{scid}$ and the DMRS port groups is enabled, an initialization value of a DMRS random sequence is obtained based on the following formula:

$$c_{init} = \left(\left\lfloor \frac{n_s}{2} \right\rfloor + 1\right) \cdot \left(2 n_{ID}^{f(n_{SCID})} + 1\right) \cdot 2^{16} + g(n_{SCID});$$

and $n_s$ is a subframe number, $n_{ID}^{f(n_{SCID})} = n_{ID}^{DMRS,f(n_{SCID})}$, $f(n_{scid}) \in \{0,1\}$ or $f(n_{scid}) \in \{0,1,2,3\}$, $n_{scid} \in \{0,1,2,3\}$ represents a scrambler ID, $n_{ID}^{DMRS,f(n_{SCID})}$ is a virtual cell ID of a terminal for DMRS demodulation, and $g(n_{SCID})$ is a modified value of $n_{SCID}$.

In an exemplary embodiment, a candidate value of $n_{ID}^{DMRS,f(n_{SCID})}$ is notified by high-layer signaling, and different candidate values are configured by the high-layer signaling for different number of codewords.

In an exemplary embodiment, with reference to a configuration of at least one of current transmission codeword and high-layer signaling, $f(n_{SCID})$ modification of $c_{init}$ is calculated in one of the following manners: $f(n_{SCID})$=xor(f $(n_{SCID})$, 1); $f(n_{SCID})$=k, k∈{0,1}.

In an exemplary embodiment, with reference to a configuration of at least one of current transmission codeword and high-layer signaling, $g(n_{SCID})$ modification of $c_{init}$ is calculated in one of the following manners: $g(n_{SCID})$=xor(g $(n_{SCID})$, 1); $g(n_{SCID})$=k, k∈{0,1}.

In an exemplary embodiment, when one codeword is transmitted, different NDI values of disabled codewords indicate different DMRS port groups, and in this case, a number of DMRS port groups is equal to a number of different NDI values; and when two codewords are transmitted, different n_scid values in Downlink Control Information (DCI) indicate DMRS port groups, and in this case, a number of DMRS port groups is equal to a number of different n_scid values.

In another embodiment of the present disclosure, a method for notifying a mapping relationship is also provided. The method includes that sending, by a sending end, a notification message to a receiving end in a Transmission Mode (TM), and the notification message is used for notifying the receiving end to select a mapping relationship from a plurality of mapping relationships, and the mapping relationship refers to a mapping relationship between a joint coding field value set and a joint coding content set, and a method for sending the notification message includes at least one of the following manners: notification via RRC Radio Resource Control (RRC) signaling; notification via a New Data Indication (NDI) of a transmission block; notification via a redundancy version of a transmission block; notification via at least one bit in a Hybrid Automatic Repeat reQuest (HARQ) process number bit field; and notification via at least one bit in a Modulation and Coding Scheme (MCS) bit field of a transmission block.

In an exemplary embodiment, the method further includes that when a number of bits indicating the mapping relationship is smaller than a number of bits in a bit field, at least one Least Significant Bit (LSB) in the bit field is used for indicating the mapping relationship.

In an exemplary embodiment, notifying different mapping relationships according to an NDI of a transmission block includes: when a disabled transmission block is in a Downlink Control Information (DCI) notification, indicating, by different NDI values of the disabled transmission block, different mapping relationships; and when the disabled transmission block is not in the DCI notification, indicating different mapping relationships includes one of the following: fixedly selecting a mapping relationship, selecting any one of N mapping relationships; indicating different mapping relationships by using an NDI of a first enabled transmission block; indicating different mapping relationships by using an NDI of a second enabled transmission block; and indicating different mapping relationships by using NDIs of all enabled transmission blocks jointly.

In an exemplary embodiment, joint coding of the joint coding field includes one of the following: joint coding containing De Modulation Reference Signal (DMRS) ports of the receiving end, the number of Physical Downlink Shared Channel (PDSCH) layers of the receiving end and scramblers $n_{scid}$ of DMRS ports of the receiving end;

and joint coding containing DMRS ports of the receiving end, the number of PDSCH layers of the receiving end, scramblers $n_{scid}$ of DMRS ports of the receiving end and DMRS power of the receiving end.

In an exemplary embodiment, when joint coding contains DMRS ports of the receiving end, the number of PDSCH layers of the receiving end and scramblers $n_{scid}$ of DMRS ports of the receiving end, a joint coding content represents a combination of DMRS port values of the receiving end, the number of PDSCH layer values of the receiving end and scrambler $n_{scid}$ values of DMRS ports of the receiving end, and all possible combinations of the DMRS ports of the receiving end, the number of the PDSCH layers of the receiving end and the scramblers $n_{scid}$ of DMRS ports of the receiving end form a joint coding content set; and when joint coding contains DMRS ports of the receiving end, the number of PDSCH layers of the receiving end, scramblers $n_{scid}$ of DMRS ports of the receiving end and DMRS power of the receiving end, the joint coding content represents a combination of DMRS port values of the receiving end, the number of PDSCH layer values of the receiving end and scrambler $n_{scid}$ values of DMRS ports of the receiving end, and all possible combinations of the DMRS ports of the receiving end, the number of the PDSCH layers of the receiving end, the scramblers $n_{scid}$ of DMRS ports of the receiving end and the DMRS power of the receiving end form a joint coding content set.

In an exemplary embodiment, the mapping relationship between the joint coding field value set and the joint coding content set satisfies at least one of the following features: different mapping relationships correspond to the same bit number of a joint coding field; the same bit value of a joint coding field is regarded as two different values when corresponding to a transmission block and two transmission blocks; mapping relationships are one-to-one correspondence mapping relationships, a joint coding field value set in one mapping relationship is a subset of the joint coding value set, and a coding content set in a mapping relationship is a subset of the coding content set; joint coding contents represented by the same value of a joint coding field in different mapping relationships are the same or different; different mapping relationships and a number of mapping relationships are pre-determined by the receiving end and the sending end; and a corresponding relationship between mapping relationship indication information and the mapping relationships is pre-appointed by the receiving end and the sending end.

In another embodiment of the present disclosure, a method for determining DMRS ports is also provided. The method includes that receiving, by a receiving end, indication information sent by a sending end in a Transmission Mode (TM), and determining, by the receiving end, DMRS ports for data demodulation of the receiving end at a current subframe according to the indication information, and the indication information includes at least one of the following: Radio Resource Control (RRC) signaling, physical layer New Data Indication (NDI) bit, and DMRS pilot scrambler configuration information $n_{scid}$.

In an exemplary embodiment, determining, by the receiving end, the DMRS ports for data demodulation of the receiving end at the current subframe according to the indication information includes: making, by the receiving end, an appointment with the sending end for N DMRS port groups, and N>1, and N is a positive integer; and obtaining, by the receiving end, the DMRS port groups of the receiving end according to at least one of the following information: acquiring, by the receiving end, DMRS port group information according to RRC signaling; determining, by the receiving end, DMRS port group information according to $n_{scid}$; acquiring, by the receiving end, DMRS port group information according to NDI signaling; determining, by the receiving end, DMRS port group information jointly according to $n_{scid}$ and information indicating whether to enable mapping between $n_{scid}$ and DMRS port groups; and after the receiving end obtains the DMRS port group information, determining, by the receiving end, the DMRS ports for data demodulation at the current subframe in conjunction with in-group DMRS port configuration information of physical layer signaling.

In an exemplary embodiment, when a corresponding relationship between $n_{scid}$ and DMRS port groups is enabled, an initialization value of a DMRS random sequence is obtained based on the following formula:

$$c_{init} = \left(\left\lfloor\frac{n_s}{2}\right\rfloor + 1\right) \cdot \left(2n_{ID}^{f(n_{SCID})} + 1\right) \cdot 2^{16} + g(n_{SCID});$$

and $n_s$ is a subframe number, $n_{ID}^{f(n_{SCID})} = n_{ID}^{DMRS, f(n_{SCID})}$, $f(n_{scid}) \in \{0,1\}$ or $f(n_{scid}) \in \{0,1,2,3\}$, $n_{scid} \in \{0,1,2,3\}$ represents a scrambler ID, $n_{ID}^{DMRS, f(n_{SCID})}$ is a virtual cell ID of a terminal for DMRS demodulation, and $g(n_{SCID})$ is a modified value of $n_{SCID}$.

In an exemplary embodiment, a candidate value of $n_{ID}^{DMRS, f(n_{SCID})}$ is notified by high-layer signaling, and high-layer signaling configures different candidate values for different number of codewords.

In an exemplary embodiment, with reference to a configuration of at least one of current transmission codeword and high-layer signaling, $f(n_{SCID})$ modification of $c_{init}$ is calculated in one of the following manners: $f(n_{SCID}) = \text{xor}(f(n_{SCID}), 1)$; $f(n_{SCID}) = k$, $k \in \{0,1\}$.

In an exemplary embodiment, with reference to a configuration of at least one of current transmission codeword and high-layer signaling, $g(n_{SCID})$ modification of $c_{init}$ is calculated in one of the following manners: $g(n_{SCID}) = \text{xor}(g(n_{SCID}), 1)$; $g(n_{SCID}) = k$, $k \in \{0,1\}$.

In an exemplary embodiment, when one codeword is transmitted, different NDI values of disabled codewords indicate different DMRS port groups, and in this case, a number of DMRS port groups is equal to a number of different NDI values; and when two codewords are transmitted, different n_scid values in Downlink Control Information (DCI) indicate different DMRS port groups, and in this case, a number of DMRS port groups is equal to a number of different n_scid values.

In another embodiment of the present disclosure, a method for determining a mapping relationship is also provided. The method includes that receiving, by a receiving end, a notification message sent by a sending end in a Transmission Mode (TM), and selecting, by the receiving end, a mapping relationship from a plurality of mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information: Radio Resource Control (RRC) signaling; a New Data Indication (NDI) of a transmission block; a redundancy version of a transmission block; at least one bit in a Hybrid Automatic Repeat reQuest (HARQ) process number bit field; and at least one bit in a Modulation and Coding Scheme (MCS) bit field of a transmission block.

In an exemplary embodiment, the method further includes that when a number of bits indicating the mapping relationship is smaller than a number of bits in the bit field, at least one Least Significant Bit (LSB) in the bit field is used for indicating the mapping relationship.

In an exemplary embodiment, joint coding of the joint coding field includes one of the following: joint coding containing De Modulation Reference Signal (DMRS) ports of the receiving end, the number of Physical Downlink Shared Channel (PDSCH) layers of the receiving end and scramblers $n_{scid}$ of DMRS ports of the receiving end; and joint coding containing DMRS ports of the receiving end, the number of PDSCH layers of the receiving end, scramblers $n_{scid}$ of DMRS ports of the receiving end and DMRS power of the receiving end.

In an exemplary embodiment, when joint coding contains DMRS ports of the receiving end, the number of PDSCH layers of the receiving end and scramblers $n_{scid}$ of DMRS ports of the receiving end, a joint coding content represents a combination of DMRS port values of the receiving end, the number of PDSCH layer values of the receiving end and scrambler $n_{scid}$ values of DMRS ports of the receiving end, and all possible combinations of the DMRS ports of the receiving end, the number the PDSCH layers of the receiving end and the scramblers $n_{scid}$ of DMRS ports of the receiving end form a joint coding content set; and when joint coding contains DMRS ports of the receiving end, the number of PDSCH layers of the receiving end, scramblers $n_{scid}$ of DMRS ports of the receiving end and DMRS power of the receiving end, the joint coding content represents a combination of DMRS port values of the receiving end, the number of PDSCH layer values of the receiving end and scrambler $n_{scid}$ values of DMRS ports of the receiving end, and all possible combinations of the DMRS ports of the receiving end, the number of the PDSCH layers of the receiving end, the scramblers $n_{scid}$ of DMRS ports of the receiving end and the DMRS power of the receiving end form a joint coding content set.

In an exemplary embodiment, the mapping relationship between the joint coding field value set and the joint coding content set satisfies at least one of the following features: different mapping relationships correspond to the same bit number of a joint coding field; the same bit value of a joint coding field is regarded as two different values when corresponding to a transmission block and two transmission blocks; mapping relationships are one-to-one correspondence mapping relationships, a value set of a joint coding field in one mapping relationship is a subset of the joint coding value set, and a coding content set in a mapping relationship is a subset of the coding content set; joint coding contents represented by the same value of a joint coding field in different mapping relationships are the same or different; different mapping relationships and a number of mapping relationships are pre-determined by the receiving end and the sending end; and a corresponding relationship between mapping relationship indication information and the mapping relationships is pre-appointed by the receiving end and the sending end.

In another embodiment of the present disclosure, a device for notifying a DMRS port is also provided. The device, located at a sending end, includes: a first sending component, arranged to send indication information to a receiving end in a Transmission Mode (TM), and indicate allocation information about DMRS ports according to the indication information, and the indication information includes at least one of the following: Radio Resource Control (RRC) signaling, physical layer New Data Indication (NDI) bit, and DMRS pilot scrambler configuration information $n_{scid}$.

In an exemplary embodiment, when a corresponding relationship between $n_{scid}$ and DMRS port groups is enabled, an initialization value of a DMRS random sequence is obtained based on the following formula:

$$c_{init} = \left(\left\lfloor \frac{n_s}{2} \right\rfloor + 1\right) \cdot \left(2 n_{ID}^{f(n_{SCID})} + 1\right) \cdot 2^{16} + g(n_{SCID})$$

and $n_s$ is a subframe number, $n_{ID}^{f(n_{SCID})} = n_{ID}^{DMRS, f(n_{SCID})}$, $f(n_{scid}) \in \{0,1\}$ or $f(n_{scid}) \in \{0,1,2,3\}$, $n_{scid} \in \{0,1,2,3\}$ represents a scrambler ID, $n_{ID}^{DMRS, f(n_{SCID})}$ is a virtual cell ID of a terminal for DMRS demodulation, and $g(n_{SCID})$ is a modified value of $n_{SCID}$.

In an exemplary embodiment, a candidate value of $n_{ID}^{DMRS, f(n_{SCID})}$ is notified by high-layer signaling, and high-layer signaling configures different candidate values for different number of codewords.

In an exemplary embodiment, with reference to a configuration of at least one of current transmission codeword and high-layer signaling, $f(n_{SCID})$ modification of $c_{init}$ is calculated in one of the following manners: $f(n_{SCID}) = \mathrm{xor}(f(n_{SCID}), 1)$; $f(n_{SCID}) = k$, $k \in \{0,1\}$.

In an exemplary embodiment, with reference to a configuration of at least one of current transmission codeword and high-layer signaling, $g(n_{SCID})$ modification of $c_{init}$ is calculated in one of the following manners: $g(n_{SCID}) = \mathrm{xor}(g(n_{SCID}), 1)$; $g(n_{SCID}) = k$, $k \in \{0,1\}$.

In an exemplary embodiment, when one codeword is transmitted, different NDI values of disabled codewords indicate different DMRS port groups, and in this case, a number of DMRS port groups is equal to a number of different NDI values; and when two codewords are transmitted, different n_scid values in Downlink Control Information (DCI) indicate DMRS port groups, and in this case, a number of DMRS port groups is equal to a number of different n_scid values.

In another embodiment of the present disclosure, a device for notifying a mapping relationship is also provided. The device, located at a sending end, includes: a second sending component, arranged to send a notification message to a receiving end in a Transmission Mode (TM), and the notification message is used for notifying the receiving end to select a mapping relationship from a plurality of mapping relationships, and the mapping relationship refers to a mapping relationship between a joint coding field value set and a joint coding content set, and a method for sending the notification message includes at least one of the following manners: notification via Radio Resource Control (RRC) signaling; notification via a New Data Indication (NDI) of a transmission block; notification via a redundancy version of a transmission block; notification via at least one bit in a Hybrid Automatic Repeat reQuest (HARQ) process number bit field; and notification via at least one bit in a Modulation and Coding Scheme (MCS) bit field of a transmission block.

In another embodiment of the present disclosure, a device for determining a DMRS port is also provided. The device, located at a receiving end, includes: a first receiving component, arranged to receive indication information sent by a sending end in a Transmission Mode (TM), and determine DMRS ports for data demodulation of the receiving end at a current subframe according to the indication information, and the indication information includes at least one of the following: Radio Resource Control (RRC) signaling, physical layer New Data Indication (NDI) bit, and DMRS pilot scrambler configuration information $n_{scid}$.

In an exemplary embodiment, when a corresponding relationship between $n_{scid}$ and DMRS port groups is enabled, an initialization value of a DMRS random sequence is obtained based on the following formula:

$$c_{init} = \left(\left\lfloor \frac{n_s}{2} \right\rfloor + 1\right) \cdot \left(2 n_{ID}^{f(n_{SCID})} + 1\right) \cdot 2^{16} + g(n_{SCID})$$

and $n_s$ is a subframe number, $n_{ID}^{f(n_{SCID})} = n_{ID}^{DMRS, f(n_{SCID})}$, $f(n_{scid}) \in \{0,1\}$ or $f(n_{scid}) \in \{0,1,2,3\}$, $n_{scid} \in \{0,1,2,3\}$ represents a scrambler ID, $n_{ID}^{DMRS, f(n_{SCID})}$ is a virtual cell ID of a terminal for DMRS demodulation, and $g(n_{SCID})$ is a modified value of $n_{SCID}$.

In an exemplary embodiment, a candidate value of $n_{ID}^{DMRS, f(n_{SCID})}$ is notified by high-layer signaling, and high-layer signaling configures different candidate values for different number of codewords.

In an exemplary embodiment, with reference to a configuration of at least one of current transmission codeword and high-layer signaling, $f(n_{SCID})$ modification of $c_{init}$ is calculated in one of the following manners: $f(n_{SCID}) = \mathrm{xor}(f(n_{SCID}), 1)$; $f(n_{SCID}) = k$, $k \in \{0,1\}$.

In an exemplary embodiment, with reference to a configuration of at least one of current transmission codeword and high-layer signaling, $g(n_{SCID})$ modification of $c_{init}$ is calculated in one of the following manners: $g(n_{SCID})=xor(g(n_{SCID}), 1)$; $g(n_{SCID})=k$, $k\in\{0,1\}$.

In an exemplary embodiment, when one codeword is transmitted, different NDI values of disabled codewords indicate different DMRS port groups, and in this case, a number of DMRS port groups is equal to a number of different NDI values; and when two codewords are transmitted, different n_scid values in Downlink Control Information (DCI) indicate different DMRS port groups, and in this case, a number of DMRS port groups is equal to a number of different n_scid values.

In another embodiment of the present disclosure, a device for determining a mapping relationship is also provided. The device, located at a receiving end, includes: a second receiving component, arranged to receive a notification message sent by a sending end in a Transmission Mode (TM), and select a mapping relationship from a plurality of mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information: Radio Resource Control (RRC) signaling; a New Data Indication (NDI) of a transmission block; a redundancy version of a transmission block; at least one bit in a Hybrid Automatic Repeat reQuest (HARQ) process number bit field; and at least one bit in a Modulation and Coding Scheme (MCS) bit field of a transmission block.

According to at least some embodiments of the present disclosure, a sending end sends indication information to a receiving end in a TM, and the sending end indicates allocation information about DMRS ports or a mapping relationship according to the indication information, and the indication information includes at least one of the following: RRC signaling, physical layer NDI bit, and DMRS pilot scrambler configuration information $n_{scid}$. The problem of influence on a performance of an MU-MIMO system caused by lower channel estimation performance due to limited orthogonal DMRS ports for MU-MIMO transmission and high MUI after increment of a total number of MU-MIMO transmission layers is solved. On a basis of saving signaling overheads, supporting dynamic switching of SU-MIMO/MU-MIMO and improving base station configuration flexibility during MU-MIMO transmission, the present disclosure increases orthogonal DMRS ports for MU-MIMO transmission, effectively inhibits MUI during channel estimation, improves channel estimation performance, and improves the performance of an MU-MIMO system.

BRIEF DESCRIPTION OF THE DRAWINGS

FIG. 1 is a flowchart of a method for notifying DMRS ports according to an embodiment of the present disclosure.

FIG. 2 is a flowchart of a method for notifying a mapping relationship according to an embodiment of the present disclosure.

FIG. 3 is a flowchart of a method for determining DMRS ports according to an embodiment of the present disclosure.

FIG. 4 is a flowchart of a method for determining a mapping relationship according to an embodiment of the present disclosure.

FIG. 5 is a structural block diagram of a device for notifying DMRS ports according to an embodiment of the present disclosure.

FIG. 6 is a structural block diagram of a device for notifying a mapping relationship according to an embodiment of the present disclosure.

FIG. 7 is a structural block diagram of a device for determining DMRS ports according to an embodiment of the present disclosure.

FIG. 8 is a structural block diagram of a device for determining a mapping relationship according to an embodiment of the present disclosure.

DETAILED DESCRIPTION

The present disclosure will be illustrated hereinbelow with reference to the drawings and in conjunction with the embodiments in detail. The embodiments in the present application and the characteristics in the embodiments may be combined under the condition of no conflicts.

The description and claims of the present disclosure and terms "first", "second" and the like in the drawings are used to distinguish similar objects, and do not need to describe a specific sequence or a precedence order.

In an exemplary embodiment, a method for notifying DMRS ports is provided. FIG. 1 is a flowchart of a method for notifying DMRS ports according to an embodiment of the present disclosure. According to an exemplary embodiment as shown in FIG. 1, the flow includes the steps as follows:

At step S102, a sending end sends indication information to a receiving end in a TM, and the sending end indicates allocation information about DMRS ports according to the indication information, and the indication information includes at least one of the following: RRC signaling, physical layer NDI bit, and DMRS pilot scrambler configuration information $n_{scid}$.

According to the above-mentioned step, the sending end sends indication information to the receiving end in the TM. And the sending end indicates allocation information about DMRS ports according to the indication information. The indication information including at least one of the following: RRC signaling, physical layer NDI bit, and DMRS pilot scrambler configuration information $n_{scid}$. The problem of influence on the performance of an MU-MIMO system caused by lower channel estimation performance due to limited orthogonal DMRS ports for MU-MIMO transmission and high MUI after increment of a total number of MU-MIMO transmission layers is solved. On the basis of saving overheads, supporting dynamic switching of SU-MIMO/MU-MIMO and improving base station configuration flexibility during MU-MIMO transmission, the present step increases orthogonal DMRS ports for MU-MIMO transmission, effectively inhibits MUI during channel estimation, improves channel estimation performance, and improves the performance of an MU-MIMO system.

In an exemplary embodiment, the sending end makes an appointment with the receiving end for N DMRS port groups, and the sending end indicates allocation information about the DMRS port groups by using the RRC signaling or the physical layer NDI bit. Different indication information values indicated by the RRC signaling or the physical layer NDI bit corresponds to different DMRS port groups, and different DMRS port sequences in the DMRS port groups correspond to different port groups, and N is a positive integer greater than 1.

In an exemplary embodiment, the sending end may indicate port allocation information in the DMRS port groups according to physical layer port allocation signaling.

In an exemplary embodiment, the sending end notifies the allocation information about the DMRS port and other M−1 pieces of information in M information joint coding manners. M is a positive integer, and the other M−1 pieces of information include at least one of the following: DMRS pilot scrambler configuration information $n_{scid}$, and layer indication information about the receiving end.

When a number of layers is r, the sending end makes an appointment with the receiving end for N different DMRS port groups corresponding to N $n_{scid}$, and r is 1 or 2, and N is a positive integer greater than 1.

In an exemplary embodiment, the step that the sending end indicates allocation information about the DMRS ports according to the indication information includes the sub-steps as follows.

The sending end notifies the receiving end whether a corresponding relationship between $n_{scid}$ and DMRS port groups is enabled, so as to indicate the allocation information about DMRS ports. And the indication information about whether to be enabled is notified according to at least one of the following manners: notification via high-layer signaling, notification via an NDI of a transmission block, and notification by fixed enabling, and in this case, N $n_{scid}$ values are bound with N DMRS port groups during joint coding, and N is a positive integer greater than 1.

When the corresponding relationship between the $n_{scid}$ and the DMRS port groups is enabled, N $n_{scid}$ values correspond to N DMRS port groups, and when the corresponding relationship between the $n_{scid}$ and the DMRS port groups is not enabled, the $n_{scid}$ does not correspond to the DMRS port groups.

In an exemplary embodiment, a method for notifying a mapping relationship is provided. FIG. 2 is a flowchart of a method for notifying a mapping relationship according to an embodiment of the present disclosure. According to an exemplary embodiment as shown in FIG. 2, the flow includes the steps as follows.

At step S202, a sending end sends a notification message to a receiving end in a TM, and the notification message is used for notifying the receiving end to select a mapping relationship from a plurality of mapping relationships, and the mapping relationship refers to a mapping relationship between a joint coding field value set and a joint coding content set, and a method for sending the notification message includes at least one of the following manners:

notification via high-layer signaling;
notification via an NDI of a transmission block;
notification via a redundancy version of a transmission block;
notification via at least one bit in an HARQ process number bit field; and
notification via at least one bit in an MCS bit field of a transmission block.

According to the above-mentioned step, the sending end sends the notification message to the receiving end in the TM. The receiving end selects the mapping relationship from multiple mapping relationships according to the notification message. The mapping relationship refers to a mapping relationship between the joint coding field value set and the joint coding content set. The problem of influence on the performance of an MU-MIMO system caused by lower channel estimation performance due to limited orthogonal DMRS ports for MU-MIMO transmission and high MUI after increment of a total number of MU-MIMO transmission layers is solved. On the basis of saving overheads, supporting dynamic switching of SU-MIMO/MU-MIMO and improving base station configuration flexibility during MU-MIMO transmission, the present step increases orthogonal DMRS ports for MU-MIMO transmission, effectively inhibits MUI during channel estimation, improves channel estimation performance, and improves the performance of an MU-MIMO system.

In an exemplary embodiment, when a number of bits indicating the mapping relationship is smaller than a number of bits in a bit field. At least one Least Significant Bit (LSB) in the bit field is used for indicating the mapping relationship.

In an exemplary embodiment, when a disabled transmission block is in a DCI notification, different NDI values of the disabled transmission block indicate different mapping relationships.

When the disabled transmission block is not in the DCI notification, indicating different mapping relationships includes one of the following: fixedly selecting a mapping relationship, selecting any one of N mapping relationships; indicating different mapping relationships by using an NDI of a first enabled transmission block; indicating different mapping relationships by using an NDI of a second enabled transmission block; and indicating different mapping relationships by using NDIs of all enabled transmission blocks jointly.

In an exemplary embodiment, joint coding of the joint coding field includes one of the following:

joint coding containing DMRS ports of the receiving end, the number of PDSCH layers of the receiving end and scramblers $n_{scid}$ of DMRS ports of the receiving end; and joint coding containing DMRS ports of the receiving end, the number of PDSCH layers of the receiving end, scramblers $n_{scid}$ of DMRS ports of the receiving end and DMRS power of the receiving end.

In an exemplary embodiment, when joint coding contains DMRS ports of the receiving end, the number of PDSCH layers of the receiving end and scramblers $n_{scid}$ of DMRS ports of the receiving end, the joint coding content represents a combination of DMRS port values of the receiving end, the number of PDSCH layer values of the receiving end and scrambler $n_{scid}$ values of DMRS ports of the receiving end. And all possible combinations of the DMRS ports of the receiving end, the number of the PDSCH layers of the receiving end and the scramblers $n_{scid}$ of DMRS ports of the receiving end form a joint coding content set.

When joint coding contains DMRS ports of the receiving end, the number of PDSCH layers of the receiving end, scramblers $n_{scid}$ of DMRS ports of the receiving end and DMRS power of the receiving end, the joint coding content represents a combination of DMRS port values of the receiving end, the number of PDSCH layer values of the receiving end and scrambler $n_{scid}$ values of DMRS ports of the receiving end. And all possible combinations of the DMRS ports of the receiving end, the number of the PDSCH layers of the receiving end, the scramblers $n_{scid}$ of DMRS ports of the receiving end and the DMRS power of the receiving end form a joint coding content set.

In an exemplary embodiment, the mapping relationship between the joint coding field value set and the joint coding content set satisfies at least one of the following features.

At one, different mapping relationships correspond to the same bit number of a joint coding field.

At two, the same bit value of a joint coding field is regarded as two different values when corresponding to a transmission block and two transmission blocks.

That is, $2^{m+1}$ elements are present in a joint coding value set, namely {value 0~$2^m$−1 corresponding to a transmission block, value $0 \sim 2^m - 1$ corresponding to two transmission blocks}. And m represents the number of bits occupied by a joint coding field.

At three, mapping relationships are one-to-one correspondence mapping relationships, a joint coding field value set in one mapping relationship is a subset of the joint coding value set. And a coding content set in a mapping relationship is a subset of the coding content set.

At four, joint coding contents represented by the same value of a joint coding field in different mapping relationships are the same or different.

At five, different mapping relationships and a number of mapping relationships are pre-determined by the receiving end and the sending end.

At six, a corresponding relationship between mapping relationship indication information and the mapping relationships is pre-appointed by the receiving end and the sending end.

In an exemplary embodiment, a method for determining DMRS ports is provided. FIG. 3 is a flowchart of a method for determining DMRS ports according to an embodiment of the present disclosure. According to an exemplary embodiment as shown in FIG. 3, the flow includes the steps as follows.

At step S302, a receiving end receives indication information sent by a sending end in a TM, and the receiving end determines, according to the indication information, DMRS ports for data demodulation of the receiving end at a current subframe. The indication information includes at least one of the following: RRC signaling, physical layer NDI bit, and DMRS pilot scrambler configuration information $n_{scid}$.

According to the above-mentioned step, the receiving end receives the indication information sent by the sending end in the TM, and the receiving end determines, according to the indication information, DMRS ports for data demodulation of the receiving end at a current subframe. The indication information includes at least one of the following: RRC signaling, physical layer NDI bit, and DMRS pilot scrambler configuration information $n_{scid}$. The problem of influence on the performance of an MU-MIMO system caused by lower channel estimation performance due to limited orthogonal DMRS ports for MU-MIMO transmission and high MUI after increment of a total number of MU-MIMO transmission layers is solved. On the basis of saving overheads, supporting dynamic switching of SU-MIMO/MU-MIMO and improving base station configuration flexibility during MU-MIMO transmission, the present step increases orthogonal DMRS ports for MU-MIMO transmission, effectively inhibits MUI during channel estimation, improves channel estimation performance, and improves the performance of an MU-MIMO system.

In an exemplary embodiment, the sending end makes an appointment with the receiving end for N DMRS port groups. N>1 and N is a positive integer, and the receiving end obtains the DMRS port groups of the receiving end according to at least one of the following information.

At one, the receiving end acquires DMRS port group information according to RRC signaling.

At two, the receiving end determines DMRS port group information according to $n_{scid}$.

At three, the receiving end acquires DMRS port group information according to NDI signaling.

At four, the receiving end determines DMRS port group information jointly according to $n_{scid}$ and information indicating whether to enable mapping between $n_{scid}$ and DMRS port groups.

At five, after the receiving end obtains the DMRS port group information, the receiving end further determines the DMRS ports for data demodulation at the current subframe in conjunction with in-group DMRS port configuration information of physical layer signaling.

In an exemplary embodiment, a method for determining a mapping relationship is provided. FIG. 4 is a flowchart of a method for determining a mapping relationship according to an embodiment of the present disclosure. According to an exemplary embodiment as shown in FIG. 4, the flow includes the steps as follows.

At step S402, a receiving end receives a notification message sent by a sending end in a TM, and the receiving end selects a mapping relationship from multiple mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information:

high-layer signaling;

an NDI of a transmission block; a redundancy version of a transmission block;

at least one bit in an HARQ process number bit field; and at least one bit in an MCS bit field of a transmission block.

According to the above-mentioned steps, the receiving end receives the notification message sent by the sending end in the TM, and the receiving end selects the mapping relationship from multiple mapping relationships according to the notification message. The mapping relationship refers to a mapping relationship between the joint coding field value set and the joint coding content set. The problem of influence on the performance of an MU-MIMO system caused by lower channel estimation performance due to limited orthogonal DMRS ports for MU-MIMO transmission and high MUI after increment of a total number of MU-MIMO transmission layers is solved. On the basis of saving overheads, supporting dynamic switching of SU-MIMO/MU-MIMO and improving base station configuration flexibility during MU-MIMO transmission, the present step increases orthogonal DMRS ports for MU-MIMO transmission, effectively inhibits MUI during channel estimation, improves channel estimation performance, and improves the performance of an MU-MIMO system.

In an exemplary embodiment, when a number of bits indicating the mapping relationship is smaller than a number of bits in the bit field, at least one Least Significant Bit (LSB) in the bit field is used for indicating the mapping relationship.

In an exemplary embodiment, joint coding of the joint coding field includes one of the following:

joint coding containing DMRS ports of the receiving end, the number of PDSCH layers of the receiving end and scramblers $n_{scid}$ of DMRS ports of the receiving end; and joint coding containing DMRS ports of the receiving end, the number of PDSCH layers of the receiving end, scramblers $n_{scid}$ of DMRS ports of the receiving end and DMRS power of the receiving end.

In an exemplary embodiment, when joint coding contains DMRS ports of the receiving end, the number of PDSCH layers of the receiving end and scramblers $n_{scid}$ of DMRS ports of the receiving end, the joint coding content represents a combination of DMRS port values of the receiving end, the number of PDSCH layer values of the receiving end and scrambler $n_{scid}$ values of DMRS ports of the receiving end. And all possible combinations of the DMRS ports of the receiving end, the number of the PDSCH layers of the receiving end and the scramblers $n_{scid}$ of DMRS ports of the receiving end form a joint coding content set.

When joint coding contains DMRS ports of the receiving end, the number of PDSCH layers of the receiving end, scramblers $n_{scid}$ of DMRS ports of the receiving end and DMRS power of the receiving end, the joint coding content represents a combination of DMRS port values of the receiving end, the number of PDSCH layer values of the receiving end and scrambler $n_{scid}$ values of DMRS ports of the receiving end. And all possible combinations of the DMRS ports of the receiving end, the number of the PDSCH layers of the receiving end, the scramblers $n_{scid}$ of DMRS ports of the receiving end and the DMRS power of the receiving end form a joint coding content set.

In an exemplary embodiment, the mapping relationship between the joint coding field value set and the joint coding content set satisfies at least one of the following features.

At one, different mapping relationships correspond to the same bit number of a joint coding field.

At two, the same bit value of a joint coding field is regarded as two different values when corresponding to a transmission block and two transmission blocks.

At three, mapping relationships are one-to-one correspondence mapping relationships. A joint coding field value set in one mapping relationship is a subset of the joint coding value set. And a coding content set in a mapping relationship is a subset of the coding content set.

At four, joint coding contents represented by the same value of a joint coding field in different mapping relationships are the same or different. That is, $2^{m+1}$ elements are present in a joint coding value set, namely {value $0 \sim 2^m - 1$ corresponding to a transmission block, value $0 \sim 2^m - 1$ corresponding to two transmission blocks}. And m represents the number of bits occupied by a joint coding field.

At five, different mapping relationships and a number of mapping relationships are pre-determined by the receiving end and the sending end.

At six, a corresponding relationship between mapping relationship indication information and the mapping relationships is pre-appointed by the receiving end and the sending end.

In an exemplary embodiment, a device corresponding to the above-mentioned method is also provided. The device is arranged to implement the above-mentioned embodiment and exemplary implementation manner. Those which have been illustrated will not be elaborated herein. Just as a term "component" used below, the combination of software and/or hardware with predetermined functions may be implemented. Although the device described by the following embodiment is better implemented by software, the implementation of hardware or the combination of software and hardware may be possible and conceived.

FIG. 5 is a structural block diagram of a device for notifying DMRS ports according to an embodiment of the present disclosure. According to an exemplary embodiment as shown in FIG. 5, the device is located at a sending end, and the device includes a first sending component 52.

The first sending component 52 is arranged to send indication information to a receiving end in a TM, and indicate allocation information about DMRS ports according to the indication information. The indication information includes at least one of the following: RRC signaling, physical layer NDI bit, and DMRS pilot scrambler configuration information $n_{scid}$.

FIG. 6 is a structural block diagram of a device for notifying a mapping relationship according to an embodiment of the present disclosure. According to an exemplary embodiment as shown in FIG. 6, the device is located at a sending end, and the device includes a second sending component 62.

The second sending component 62 is arranged to send a notification message to a receiving end in a TM, and the notification message is used for notifying the receiving end to select a mapping relationship from a plurality of mapping relationships, and the mapping relationship refers to a mapping relationship between a joint coding field value set and a joint coding content set, and a method for sending the notification message includes at least one of the following manners:

notification via high-layer signaling;
notification via an NDI of a transmission block;
notification via a redundancy version of a transmission block;
notification via at least one bit in an HARQ process number bit field; or
notification via at least one bit in an MCS bit field of a transmission block.

FIG. 7 is a structural block diagram of a device for determining DMRS ports according to an embodiment of the present disclosure. According to an exemplary embodiment as shown in FIG. 7, the device is located at a receiving end, and the device includes a first receiving component 72.

The first receiving component 72 is arranged to receive indication information sent by a sending end in a TM, and determine, by the receiving end DMRS ports for data demodulation of the receiving end at a current subframe according to the indication information. The indication information includes at least one of the following: RRC signaling, physical layer NDI bit, and DMRS pilot scrambler configuration information $n_{scid}$.

FIG. 8 is a structural block diagram of a device for determining a mapping relationship according to an embodiment of the present disclosure. According to an exemplary embodiment as shown in FIG. 8, the device is located at a receiving end, and the device includes a second receiving component 82.

The second receiving component 82 is arranged to receive a notification message sent by a sending end in a TM, and select a mapping relationship from multiple mapping relationships according to the notification message, and the mapping relationship refers to a mapping relationship between a joint coding field value set and a joint coding content set, a joint coding content is obtained according to values in the joint coding field and with reference to the mapping relationship, and the notification message includes at least one of the following information:

high-layer signaling;
an NDI of a transmission block; a redundancy version of a transmission block;
at least one bit in an HARQ process number bit field; and
at least one bit in an MCS bit field of a transmission block.

In the above-mentioned embodiment, when a corresponding relationship between $n_{scid}$ and DMRS port groups is enabled, an initialization value of a DMRS random sequence is obtained based on the following formula:

$$c_{init} = \left(\left\lfloor \frac{n_s}{2} \right\rfloor + 1\right) \cdot \left(2n_{ID}^{f(n_{SCID})} + 1\right) \cdot 2^{16} + g(n_{SCID})$$

in which $n_s$ is a subframe number, $n_{ID}^{f(n_{SCID})} = n_{ID}^{DMRS, f(n_{SCID})}$, $f(n_{scid}) \in \{0,1\}$ or $f(n_{scid}) \in \{0,1,2,3\}$, $n_{scid} \in \{0,1,2,3\}$ represents a scrambler ID, $n_{ID}^{DMRS,f(nSCID)}$ is a virtual cell ID of a terminal for DMRS demodulation, and $g(n_{SCID})$ is a modified value of $n_{SCID}$.

In an exemplary embodiment, a candidate value of $n_{ID}^{DMRS,f(nSCID)}$ is notified by high-layer signaling. And the high-layer signaling configures different candidate values for different number of codewords.

In an exemplary embodiment, with reference to a configuration of at least one of current transmission codeword and high-layer signaling, $f(n_{SCID})$ modification for $c_{init}$ is calculated in one of the following manners:

$f(n_{SCID})=xor(f(n_{SCID}),1)$;

$f(n_{SCID})=k,k \in \{0,1\}$.

In an exemplary embodiment, with reference to a configuration of at least one of current transmission codeword and high-layer signaling, $g(n_{SCID})$ modification for $c_{init}$ is calculated in one of the following manners:

$g(n_{SCID})=xor(g(n_{SCID}),1)$;

$g(n_{SCID})=k,k \in \{0,1\}$.

In the above-mentioned embodiment, when one codeword is transmitted, different NDI values of disabled codewords indicate different DMRS port groups. And in this case, A number of DMRS port groups is equal to A number of different NDI values. And when two codewords are transmitted, different n_scid values in DCI indicate different DMRS port groups. And in this case, a number of DMRS port groups is equal to a number of different n_scid values.

The present disclosure will be illustrated below in conjunction with exemplary embodiments and implementation manners in detail.

In an alternate exemplary embodiment, a sending end instructs a receiving end to make a selection in $2^n$ mapping relationships according to high-layer n bit signaling. Here, it is supposed that n=1, the receiving end is instructed to select a mapping relationship 1 when a high-layer signaling value is 0. And the receiving end is instructed to select a mapping relationship 2 when a high-layer signaling value is 1. Herein, the mapping relationship 1 is as shown in Table 1. In this case, a joint coding value 7 corresponding to a transmission block does not correspond to any coding content, and does not pertain to a joint coding value set in the mapping relationship as reserved. That is, a joint coding value set corresponding to the mapping relationship 1 consists of 13 values {values 0 to 6 corresponding to a transmission block, values 0 to 7 corresponding to two transmission blocks}, and a joint coding content set in a mapping relationship consists of joint coding contents corresponding to each value in a joint coding value set as shown in Table, totally 13 elements. The mapping relationship 2 is as shown in Table 2.

The receiving end makes a selection in $2^n$ mapping relationships according to n bit high-layer signaling. Specifically, in the present exemplary embodiment, if a bit value of high-layer signaling 1 received by the receiving end is 0, a mapping relationship 1 namely Table 1 is selected. And then a joint coding content is obtained according to a received value of a joint coding field with reference to Table 1. If a bit value of high-layer signaling 1 received by the receiving end is 1, a mapping relationship 2 namely Table 2 is selected. And then a joint coding content is obtained according to a received value of a joint coding field with reference to Table 2.

In the present exemplary embodiment, joint coding contains layers of the receiving end, DMRS ports and scrambler IDs nSCID corresponding to DMRS ports.

TABLE 1

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 2

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID}$ = 0 | 0 | 2 layers, port 11, 13, $n_{SCID}$ = 0 |
| 1 | 1 layer, port 11, $n_{SCID}$ = 1 | 1 | 2 layers, port 11, 13, $n_{SCID}$ = 1 |
| 2 | 1 layer, port 13, $n_{SCID}$ = 0 | 2 | 3 layers, ports 7-9 |
| 3 | 1 layer, port 13, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In Table 1 and Table 2, items not marked as nSCID represent nSCID=0. In the present exemplary embodiment, different mapping relationships are allocated to different receiving ends according to high-layer signaling, so as to achieve orthogonality of DMRS ports for MU-MIMO of more receiving ends.

For example, each receiving end transmits one layer in MU-MIMO transmission. Table 1 is allocated to receiving ends 1 and 2, Table 2 is allocated to receiving ends 3 and 4. And a port 7 (value 0 during a transmission block in Table 1), a port 8 (value 2 during a transmission block in Table 1), a port 11 (value 0 during a transmission block in Table 2) and a port 13 (value 2 during a transmission block in Table 2) are allocated to receiving ends 1 to 4 in sequence, so as to achieve orthogonality of DMRS ports of four receiving ends.

If each receiving end transmits one layer, Table 1 is allocated to receiving ends 1 to 4, and Table 2 is allocated to receiving ends 5 to 8. And DMRS port 7 $n_{scid}$=0, DMRS port 8 $n_{scid}$=0, DMRS port 7 $n_{scid}$=1 and DMRS port 8 $n_{scid}$=1 are allocated to the receiving ends 1 to 4 in sequence, namely correspond to values 0 to 3 of a transmission block in Table 1 in sequence. And DMRS port 11 $n_{scid}$=0, DMRS port 13 $n_{scid}$=0, DMRS port 11 $n_{scid}$=1 and DMRS port 13 $n_{scid}$=1 are allocated to the receiving ends 5 to 8 in sequence, namely correspond to values 0 to 3 of a transmission block in Table 2 in sequence. And MU-MIMO transmission with four orthogonal layers and four pseudo-orthogonal layers is supported in such a way.

If two layers are allocated to each receiving end, Table 1 is allocated to receiving ends 1 and 2, and Table 2 is allocated to receiving ends 3 and 4. Values 0 and 1 corresponding to two transmission blocks in Table 1 are allocated to the receiving ends 1 and 2 in sequence, and values 0 and 1 corresponding to two transmission blocks in Table 2 are allocated to the receiving ends 3 and 4 in sequence, so that MU-MIMO transmission with four orthogonal layers and four pseudo-orthogonal layers can be achieved.

To sum up, according to the method in the present exemplary embodiment, eight-layer MU-MIMO transmission in which each receiving end transmits one or two layers is achieved, eight DMRS ports have two pseudo-orthogonal groups, and each pseudo-orthogonal group has four orthogonal DMRS ports.

In case of one-layer SU-MIMO transmission, any one in DMRS ports {7, 8, 11, 13} is equivalent in effect. In case of two-layer SU-MIMO transmission, ports {7, 8} and ports {11, 13} are equivalent. And items in two tables corresponding to two layers or more are the same, so that a high-layer indication parameter update period may be longer, and can adapt to dynamic switching of SU-MIMO/MU-MIMO transmission.

In the above-mentioned manner, a situation in which a transmission block in an existing 212 protocol is continuously maintained to correspond to 2, 3, 4 layers is suitable for initial transmission.

IDs nSCID corresponding to DMRS ports, and DMRS power of the receiving end.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0, P = A | 0 | 2 layers, ports 7-8, $n_{SCID}$ = 0, P = A |
| 1 | 1 layer, port 7, $n_{SCID}$ = 1, P = B | 1 | 2 layers, ports 7-8, $n_{SCID}$ = 1, P = B |
| 2 | 1 layer, port 8, $n_{SCID}$ = 0, P = A | 2 | 3 layers, ports 7-9 |
| 3 | 1 layer, port 8, $n_{SCID}$ = 1, P = B | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 1 layers, port7, $n_{SCID}$ = 2, P = C | 7 | 8 layers, ports 7-14 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID}$ = 0, P = A1 | 0 | 2 layers, port 11, 13, $n_{SCID}$ = 0, P = A1 |
| 1 | 1 layer, port 11, $n_{SCID}$ = 1, P = B1 | 1 | 2 layers, port 11, 13, $n_{SCID}$ = 1, P = B1 |
| 2 | 1 layer, port 13, $n_{SCID}$ = 0, P = A1 | 2 | 3 layers, ports 7-9 |
| 3 | 1 layer, port 13, $n_{SCID}$ = 1, P = B1 | 3 | 4 layers, ports 7-10 |
| 4 | 2 layers, ports 7-8 | 4 | 2 layer, ports 7~8, $n_{SCID}$ = 2, P = C |
| 5 | 1 layer, port 11, $n_{SCID}$ = 2, P = C1 | 5 | 2 layer, ports 7~8, $n_{SCID}$ = 3, P = D |
| 6 | 1 layer, port 13, $n_{SCID}$ = 3, P = D1 | 6 | 2 layer, ports 11, 13, $n_{SCID}$ = 2, P = C1 |
| 7 | 1 layers, port8, $n_{SCID}$ = 2, P = C | 7 | 2 layer, ports 11, 13, $n_{SCID}$ = 3, P = D1 |

Table 1 and Table 2 in the present exemplary embodiment are situations about joint coding field 3 bits. The present exemplary embodiment does not limit other joint coding value sets and joint coding content sets.

In an alternate exemplary embodiment, a sending end instructs a receiving end to make a selection in $2^n$ mapping relationships according to high-layer n bit signaling. Here, it is supposed that n=1, a mapping relationship 1 is as shown in Table 3, and a mapping relationship 2 is as shown in Table 4.

The receiving end makes a selection in $2^n$ mapping relationships according to n bit high-layer signaling. Specifically, in the present exemplary embodiment, if a bit value of high-layer signaling 1 received by the receiving end is 0, a mapping relationship 1 namely Table 3 is selected. And then a joint coding content is obtained according to a received value of a joint coding field with reference to Table 3. If a bit value of high-layer signaling 1 received by the receiving end is 1, a mapping relationship 2 namely Table 4 is selected. And then a joint coding content is obtained according to a received value of a joint coding field with reference to Table 4.

In the present exemplary embodiment, joint coding contains layers of the receiving end, DMRS ports, scrambler In Table 3 and Table 4, P represents a power difference between a DMRS and a PDSCH of a receiving end. In Table 3 and Table 4, receiving ends not marked as nSCID determine a power difference between a DMRS and a PDSCH according to the number of layers. That is, if the number of layers is smaller than or equal to 2, the power difference between the DMRS and the PDSCH is 0 dB, and if the number of layers is greater than 2, the power difference between the DMRS and the PDSCH is 3 dB. Items marked as nSCID obtain a power difference between a DMRS and a PDSCH according to the value of P. And {A, B, C, D, A1, B1, C1, D1} is a fixed value.

In this case, Table 4 is allocated to a receiving end with poor channel quality or few receiving end antennae. Table 3 is allocated to a receiving end with good channel quality or many receiving end antennae. More pseudo-orthogonal groups may be implemented in such a way. That is, at most four pseudo-orthogonal groups are achieved. And there are four orthogonal DMRS ports {7, 8, 11, 13} in each pseudo-orthogonal group. That is, at most 16 DMRS pseudo-orthogonal DMRS ports are implemented for MU-MIMO transmission. Meanwhile, in Table 3 and Table 4, DMRS pilot power is adjusted for improving pilot power when increment of a total number of MU-MIMO transmission layers, so as to improve channel estimation performance.

Meanwhile, when Table 4 is used, it is necessary to cancel limitation over values 5 and 6 of a transmission block in the existing 212 protocol for initial transmission.

For example, Table 3 is allocated to receiving ends 1 and 2, Table 4 is allocated to receiving ends 7 and 8. And values 0 and 1 corresponding to two transmission blocks in Table 3 are allocated to the receiving ends 1 and 2 in sequence, and values {0, 1, 4-7} corresponding to two transmission blocks in Table 4 are allocated to the receiving ends 3 to 8 in sequence.

In another implementation manner of the present exemplary embodiment, the mapping relationship 2 is as shown in Table 5.

TABLE 5

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID} = 0$, P = A1 | 0 | 2 layers, port 11, 13, $n_{SCID} = 0$, P = A1 |
| 1 | 1 layer, port 11, $n_{SCID} = 1$, P = B1 | 1 | 2 layers, port 11, 13, $n_{SCID} = 1$, P = B1 |
| 2 | 1 layer, port 13, $n_{SCID} = 0$, P = A1 | 2 | 3 layers, ports 7-9 |
| 3 | 1 layer, port 13, $n_{SCID} = 1$, P = B1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 1 layer, port 7, $n_{SCID} = 2$, P = C | 6 | 2 layers, ports7~8, $n_{SCID} = 2$, P = C |
| 7 | 1 layer, port8, $n_{SCID} = 2$, P = C | 7 | 2 layers, ports11, 13, $n_{SCID} = 2$, P = C1 |

In Table 3, Table 4 and Table 5, items not marked as nSCID represent nSCID=0. Compared with Table 4 and Table 5, increment of the number of user transmission layers may be supported, so that a high-layer signaling update period may be relatively prolonged.

In an alternate exemplary embodiment, a sending end instructs a receiving end to make a selection in different mapping relationships according to an NDI of a transmission block in a DCI command.

In the present exemplary embodiment, if the receiving end receives one enabled transmission block and one disabled transmission block in DCI, the receiving end selects a mapping relationship table according to an NDI value of the disabled transmission block. If the NDI value is 0, the receiving end selects Table 6, and if the NDI value is 1, the receiving end selects Table 7. If the receiving end receives two enabled transmission blocks in DCI, the receiving end selects a mapping relationship 1 namely Table 6. The receiving end obtains a joint coding field value in a DCI command with reference to the selected mapping relationship table, and obtains a joint coding content with reference to the selected mapping relationship table.

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID} = 0$ | 0 | 2 layers, ports 7-8, $n_{SCID} = 0$ |
| 1 | 1 layer, port 11, $n_{SCID} = 1$ | 1 | 2 layers, ports 7-8, $n_{SCID} = 1$ |
| 2 | 1 layer, port 13, $n_{SCID} = 0$ | 2 | 3 layers, ports 7-9 |
| 3 | 1 layer, port 13, $n_{SCID} = 1$ | 3 | 4 layers, ports 7-10 |
| 4 | 2 layer, port 11, 13, $n_{SCID} = 0$ | 4 | 5 layers, ports 7-11 |

TABLE 7-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 5 | 2 layer, port 11, 13, $n_{SCID} = 1$ | 5 | 6 layers, ports 7-12 |
| 6 | 2 layers, ports 7-8 $n_{SCID} = 1$ | 6 | 7 layers, ports 7-13 |
| 7 | Reserved | 7 | 8 layers, ports 7-14 |

Another implementation manner of a mapping table 7 in the present exemplary embodiment is as shown in Table 8.

TABLE 8

| One Codeword: Codeword 0 enabled, Codeword 1 disabled | |
|---|---|
| Value | Message |
| 0 | 1 layer, port 11, $n_{SCID} = 0$ |
| 1 | 1 layer, port 11, $n_{SCID} = 1$ |
| 2 | 1 layer, port 13, $n_{SCID} = 0$ |
| 3 | 1 layer, port 13, $n_{SCID} = 1$ |
| 4 | 2 layer, port 11, 13, $n_{SCID} = 0$ |
| 5 | 2 layer, port 11, 13, $n_{SCID} = 1$ |
| 6 | 2 layers, ports 7-8 $n_{SCID} = 1$ |
| 7 | Reserved |

In Table 6, Table 7 and Table 8, items not marked as nSCID represent nSCID=0. In the present exemplary embodiment, the receiving end is instructed to make a selection between Table 6 and Table 7 according to the NDI of the disabled transmission block. And more orthogonal DMRS ports are supported for MU-MIMO transmission whilst dynamic switching of SU-MIMO/MU-MIMO is supported to the greatest extent.

For example, values 0 to 3 corresponding to a transmission block in Table 6 are allocated to the receiving ends 1 to 4 in sequence. And values 0 to 3 corresponding to a transmission block in Table 7 are allocated to the receiving ends 5 to 8 in sequence. Two pseudo-orthogonal groups are provided for MU-MIMO DMRS ports, and each group includes four orthogonal DMRS ports.

Or, a value 4 corresponding to a transmission block in Table 6 is allocated to the receiving end 1, and values 4 to 6 corresponding to a transmission block in Table 7 are allocated to the receiving ends 2 to 4 in sequence. In this case, each receiving end has two layers. Two pseudo-orthogonal groups are provided for MU-MIMO DMRS ports, and each group includes four orthogonal DMRS ports.

Certainly, there are also other port allocation solutions.

In an implementation manner of the present disclosure, the number of layers transmitted by each receiving end participating in MU-MIMO transmission is limited to be smaller than or equal to 2, in correspondence to a transmission block.

In another implementation manner of the present disclosure, the number of layers transmitted by each receiving end participating in MU-MIMO transmission is not limited. That is, the number of layers may be 1 to 8, in correspondence to two transmission blocks. When there are two transmission blocks, the receiving end selects Table 6 in default.

In an alternate exemplary embodiment, a sending end indicates a receiving end of whether a mapping relationship between scrambler $n_{scid}$ values of DMRS ports in joint coding and port groups is enabled.

When not enabled, DMRS ports indicated in DCI joint coding are DMRS ports for data demodulation of the receiving end at a current subframe, and $n_{scid}$ does not correspond to DMRS port groups.

When enabled, the receiving end obtains a port group according to $n_{scid}$ in DCI joint coding. If the port group is 1, DMRS ports indicated in DCI joint coding are DMRS ports for data demodulation of the receiving end at a current subframe. And if the port group is 2, DMRS ports indicated in DCI joint coding are replaced with ports in the port group 2 to serve as DMRS ports for data demodulation thereof at a current subframe.

In the present exemplary embodiment, a port group 1 is DMRS ports {7, 8}, and a port group 2 is DMRS ports {11, 13}. $n_{scid}=0$ corresponds to the port group 1, $n_{scid}=1$ corresponds to the port group 2, the port 7 corresponds to the port 11, and the port 8 corresponds to the port 13.

In the present exemplary embodiment, a reference mapping relationship between a joint coding field set and a joint coding content is as shown in Table 9.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

As for information indicating whether to be enabled, an implementation manner of the present exemplary embodiment is: notification via high-layer signaling. Specifically, a 1 bit high-layer signaling $n_{scid}$-Point_DMRSPortType indicates whether a scrambler $n_{scid}$ value indication port type is enabled.

$n_{scidPoint_{DMRSPortType}} = 0$ represents disabled, and $n_{scidPoint_{DMRSPortType}} = 1$ represents enabled. In this case, a reference mapping relationship between a joint coding field set and a joint coding content is as shown in Table 9.

As for information indicating whether to be enabled, another implementation manner of the present exemplary embodiment is: indication via an NDI of a transmission block. Specifically, NDI of disabled transmission block=0 represents disabled, and NDI=1 represents enabled. A reference mapping relationship between a joint coding field set and a joint coding content is as shown in Table 9 or Table 10 when one of the following conditions is satisfied.

At one, there is not a disabled transmission block.

At two, a fixed scrambler $n_{scid}$ value indicates that a port type is enabled.

At three, a fixed scrambler $n_{scid}$ value indicates that a port type is disabled.

At four an NDI of a first transmission block is used to indicate whether to be enabled.

At five an NDI of a second transmission block is used to indicate whether to be enabled.

As for information indicating whether to be enabled, a third implementation manner of the present exemplary embodiment is: indicating whether a scrambler $n_{scid}$ value indication port type is enabled according to at least one LSB bit of an RV bit field of a first enabled transmission block.

As for information indicating whether to be enabled, a fourth implementation manner of the present exemplary embodiment is: indicating whether a scrambler $n_{scid}$ value indication port type is enabled according to at least one LSB bit of an MCS bit field of a first enabled transmission block.

As for information indicating whether to be enabled, a fifth implementation manner of the present exemplary embodiment is: indicating whether a scrambler $n_{scid}$ value indication port type is enabled according to at least one LSB bit of a process number bit field.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | 2 layers, ports 7-8, $n_{SCID}=1$ | 7 | 8 layers, ports 7-14 |

When a corresponding relationship between $n_{scid}$ and port groups is not enabled, DMRS ports obtained by the receiving end according to a joint coding field value and with reference to the reference mapping relationship table (Table 9 or Table 10) are DMRS ports of the receiving end at a current subframe. For example, the value of a transmission block corresponding to a joint coding field value of the receiving end is 1, and a DMRS port for data demodulation thereof at a current subframe is a port 7. The value of a transmission block corresponding to a joint coding field value of the receiving end is 3, and a DMRS port for data demodulation thereof at a current subframe is a port 8. And the value of two transmission blocks corresponding to a joint coding field value of the receiving end is 1, and DMRS ports for data demodulation thereof at a current subframe are ports 7 and 8.

When a corresponding relationship between $n_{scid}$ and port groups is enabled, the receiving end obtains a port group according to $n_{scid}$ in a joint coding field and obtains a DMRS port with reference to the reference mapping relationship table (Table 9 or Table 10). If the port group is 1, the DMRS port is a DMRS port for data demodulation of the receiving end at a current subframe. And if the port group is 2, a DMRS port indicated in DCI joint coding is replaced with a port in the port group 2 to serve as a DMRS port for data demodulation thereof at a current subframe. Herein, a port 7 in the port group 1 corresponds to a port 11 in the port group 2, and a port 8 in the port group 1 corresponds to a port 13 in the port group 2. For example, the value of a transmission block corresponding to a joint coding field value of the receiving end is 1, and a DMRS port for data demodulation thereof at a current subframe is a port 11. The value of a transmission block corresponding to a joint coding field value of the receiving end is 3, and a DMRS port for data demodulation thereof at a current subframe is a port 13. And the value of two transmission blocks corresponding to a joint coding field value of the receiving end is 1, and DMRS ports for data demodulation thereof at a current subframe are ports 11 to 13.

When the corresponding relationship between $n_{scid}$ and DMRS port groups is enabled, it is necessary to modify an existing initialization manner of generating a DMRS random sequence namely Formula (1) into Formula (2):

$$c_{init}=(\lfloor n_s/2 \rfloor+1)\cdot(2n_{ID}^{(nscid)}+1)\cdot 2^{16}+n_{scid} \quad (1)$$

$$c_{init}=(\lfloor n_s/2 \rfloor+1)\cdot(2n_{ID}^{(nscid)}+1)\cdot 2^{16} \quad (2)$$

In the above formulas $n_s$ is a subframe number, $n_{ID}^{(nscid)}=n_{ID}^{DMRS,n_{scid}}$. A DMRS random sequence is a Gold random sequence defined by a 31-bit binary initialization value. And a final DMRS is obtained by multiplying the generated DMRS random sequence, after QPSK modulation, by an Orthogonal Code (OCC). In this case, when $n_{ID}^{DMRS,0}$ of a terminal 1 and $n_{ID}^{DMRS,1}$ of a terminal 2 are the same (or $n_{ID}^{DMRS,1}$ of a terminal 1 and $n_{ID}^{DMRS,0}$ of a terminal 2 are the same). A port group may be dynamically indicated by $n_{scid}$ in DCI, so as to achieve DMRS orthogonality of the terminal 1 and the terminal 2.

In an alternate exemplary embodiment, a sending end notifies a receiving end of selection in multiple mapping relationships. Different pieces of indication information correspond to different mapping relationships. The indication information includes at least one of the following information:

high-layer signaling;
an NDI of a transmission block;
a redundancy version of a transmission block;
at least one bit in an HARQ process number bit field; and
at least one bit in an MCS bit field of a transmission block.

In an exemplary embodiment, when a number of bits indicating the mapping relationship is smaller than a number of bits in a bit field, at least one LSB in the bit field is occupied by bits indicating the mapping relationship.

Specifically, in the present exemplary embodiment, the sending end notifies the receiving end of selection in four mapping relationships. A corresponding relationship between the indication information and a mapping relationship is as shown in Table 11.

TABLE 11

| Indication information value | Mapping relationship |
| --- | --- |
| 00 | Table 12 |
| 01 | Table 13 |
| 10 | Table 14 |
| 11 | Table 15 |

A first implementation manner for 2-bit indication information in the present exemplary embodiment is: notification via high-layer information.

A second implementation manner for 2-bit indication information in the present exemplary embodiment is: indication via an NDI of a transmission block. Herein, the above 2-bit indication information indicates that 1 bit on the left of the bits consists of an NDI of a first enabled transmission block. And the above 2-bit indication information indicates that 1 bit on the right of the bits consists of an NDI of another transmission block other than a first enabled transmission block.

A third implementation manner for 2-bit indication information in the present exemplary embodiment is: indication via an RV of a transmission block. Herein, the above 2-bit indication information indicates that 1 bit on the left of the bits consists of an LSB bit of an RV bit field of a first enabled transmission block. And the above 2-bit indication information indicates that 1 bit on the right of the bits consists of an LSB bit of an RV bit field of another transmission block other than a first enabled transmission block.

A fourth implementation manner for 2-bit indication information in the present exemplary embodiment is: indication via an RV of a transmission block. Herein, the above 2-bit indication information consists of two LSB bits of an RV bit field of a first enabled transmission block.

A fifth implementation manner for 2-bit indication information in the present exemplary embodiment is: indication via an MCS of a transmission block. Herein, the above 2-bit indication information indicates that 1 bit on the left of the bits consists of an LSB bit of an MCS bit field of a first enabled transmission block. And the above 2-bit indication information indicates that 1 bit on the right of the bits consists of an LSB bit of an MCS bit field of another transmission block other than a first enabled transmission block.

A sixth implementation manner for 2-bit indication information in the present exemplary embodiment is: indication via an MCS of a transmission block. Herein, the above 2-bit indication information consists of two LSB bits of an MCS bit field of a first enabled transmission block.

A seventh implementation manner for 2-bit indication information in the present exemplary embodiment is: indication via two LSB bits of a process number indication field.

An eighth implementation manner for 2-bit indication information in the present exemplary embodiment is: joint indication via an NDI and an RV of a transmission block. Herein, the above 2-bit indication information indicates that 1 bit on the left of the bits consists of an LSB bit of an RV bit field of a first enabled transmission block. And the above 2-bit indication information indicates that 1 bit on the right of the bits consists of an NDI of another transmission block other than a first enabled transmission block.

TABLE 12

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID} = 0$ | 0 | 2 layers, port 11, 13, $n_{SCID} = 0$ |
| 1 | 1 layer, port 11, $n_{SCID} = 1$ | 1 | 2 layers, port 11, 13, $n_{SCID} = 1$ |
| 2 | 1 layer, port 13, $n_{SCID} = 0$ | 2 | 3 layers, ports 7-9, $n_{SCID} = 1$ |
| 3 | 1 layer, port 13, $n_{SCID} = 1$ | 3 | 4 layers, ports 7-10, $n_{SCID} = 1$ |
| 4 | 2 layers, ports 7-8, $n_{SCID} = 1$ | 4 | 5 layers, ports 7-11, $n_{SCID} = 1$ |
| 5 | 3 layers, ports 7-9, $n_{SCID} = 1$ | 5 | 6 layers, ports 7-12, $n_{SCID} = 1$ |
| 6 | 4 layers, ports 7-10, $n_{SCID} = 1$ | 6 | 7 layers, ports 7-13, $n_{SCID} = 1$ |
| 7 | 2 layers, ports 7-8, $n_{SCID} = 1$ | 7 | 8 layers, ports 7-14, $n_{SCID} = 1$ |

TABLE 14

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 2$ | 0 | 2 layers, port 7~8, $n_{SCID} = 2$ |
| 1 | 1 layer, port 7, $n_{SCID} = 3$ | 1 | 2 layers, port 7~8, $n_{SCID} = 3$ |
| 2 | 1 layer, port 8, $n_{SCID} = 2$ | 2 | 3 layers, ports 7-9, $n_{SCID} = 2$ |
| 3 | 1 layer, port 8, $n_{SCID} = 3$ | 3 | 4 layers, ports 7-10, $n_{SCID} = 2$ |
| 4 | 2 layers, ports 7-8, $n_{SCID} = 2$ | 4 | 5 layers, ports 7-11, $n_{SCID} = 2$ |
| 5 | 3 layers, ports 7-9, $n_{SCID} = 2$ | 5 | 6 layers, ports 7-12, $n_{SCID} = 2$ |
| 6 | 4 layers, ports 7-10, $n_{SCID} = 2$ | 6 | 7 layers, ports 7-13, $n_{SCID} = 2$ |
| 7 | 2 layers, ports 7-8, $n_{SCID} = 2$ | 7 | 8 layers, ports 7-14, $n_{SCID} = 2$ |

TABLE 15

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID} = 2$ | 0 | 2 layers, port 11, 13, $n_{SCID} = 2$ |
| 1 | 1 layer, port 11, $n_{SCID} = 3$ | 1 | 2 layers, port 11, 13, $n_{SCID} = 3$ |
| 2 | 1 layer, port 13, $n_{SCID} = 2$ | 2 | 3 layers, ports 7-9, $n_{SCID} = 3$ |
| 3 | 1 layer, port 13, $n_{SCID} = 3$ | 3 | 4 layers, ports 7-10, $n_{SCID} = 3$ |
| 4 | 2 layers, ports 7-8, $n_{SCID} = 3$ | 4 | 5 layers, ports 7-11, $n_{SCID} = 3$ |
| 5 | 3 layers, ports 7-9, $n_{SCID} = 3$ | 5 | 6 layers, ports 7-12, $n_{SCID} = 3$ |
| 6 | 4 layers, ports 7-10, $n_{SCID} = 3$ | 6 | 7 layers, ports 7-13, $n_{SCID} = 3$ |
| 7 | 2 layers, ports 7-8, $n_{SCID} = 3$ | 7 | 8 layers, ports 7-14, $n_{SCID} = 3$ |

In Table 12 to Table 15, items that are not marked represent nSCID=0, one to four layers of transmission are reserved for a codeword in Table 12 to Table 15, two to eight layers of port allocation are reserved for two codewords, in order to solve the problem of collision between two contents needing to be indicated by bits indicating the mapping relationship. One of the two contents represents an original indication content (such as RV, MCS, NDI, and process number) of the information bit, and the other content represents an indicated mapping relationship. For example, in the above sixth implementation manner, if an MCS value of the first enabled transmission block is 19, the value of two LSB bit fields is 11, which indicates eight-layer SU-MIMO transmission. However, if there is no eight-layer SU-MIMO scheduling in Table 15, it is necessary to modify two LSB indication bit fields of an MCS bit field into other values, or other layers in Table 15 are adopted for allocation, so as to reduce system performance and limit base station scheduling.

In an alternate exemplary embodiment, a sending end instructs a receiving end to make a selection in different mapping relationships according to an NDI of a transmission block in a DCI command. When there is a disabled transmission block, the NDI of the disabled transmission block indicates selection in different mapping relationships. When there is not a disabled transmission block, the receiving end transmits two transmission blocks, and the sending end instructs the receiving end to select a mapping relationship in one of the following manners.

At one, selecting different mapping relationships according to an NDI of a first enabled transmission block.

At two, selecting different mapping relationships according to an NDI of a second enabled transmission block.

In the present exemplary embodiment, if the receiving end receives one enabled transmission block and one disabled transmission block in DCI, the receiving end selects a mapping relationship table according to an NDI value of the disabled transmission block. And if the receiving end receives two enabled transmission blocks in DCI, the receiving end selects different mapping relationships according to the NDI of the first enabled block or selects different mapping relationships according to the NDI of the second enabled block. And if the NDI value is 0, the receiving end selects Table 16, and if the NDI value is 1, the receiving end selects Table 17. The receiving end obtains a joint coding field value in a DCI command with reference to the selected mapping relationship table, and obtains a joint coding content with reference to the selected mapping relationship table.

TABLE 16

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 17

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID} = 0$ | 0 | 2 layers, ports 11, 13, $n_{SCID} = 0$ |
| 1 | 1 layer, port 11, $n_{SCID} = 1$ | 1 | 2 layers, ports 11, 13, $n_{SCID} = 1$ |
| 2 | 1 layer, port 13, $n_{SCID} = 0$ | 2 | 3 layers, ports 7-9 |
| 3 | 1 layer, port 13, $n_{SCID} = 1$ | 3 | 4 layers, ports 7-10 |
| 4 | 2 layer, port 11, 13, $n_{SCID} = 0$ | 4 | 5 layers, ports 7-11 |
| 5 | 2 layer, port 11, 13, $n_{SCID} = 1$ | 5 | 6 layers, ports 7-12 |
| 6 | 2 layers, ports 7-8 $n_{SCID} = 1$ | 6 | 7 layers, ports 7-13 |
| 7 | Reserved | 7 | 8 layers, ports 7-14 |

In Table 16 and Table 17, items that are not marked represent nSCID=0. In an alternate exemplary embodiment, a sending end makes an appointment with a receiving end for N port groups. And the sending end indicates a port group which should be selected at a current subframe of the receiving end according to at least one of the following indication information:

RRC signaling; and
physical layer NDI.

The receiving end further determines a DMRS port for data demodulation at a current subframe according to DMRS port group information and in conjunction with DMRS port configuration information of physical layer signaling.

Specifically, in the present exemplary embodiment, N=2, a port group 1 is DMRS ports {7, 8}, a port group 2 is DMRS ports {11, 13}, and a joint coding table of ports, layers and scramblers in a DCI command is as shown in Table 18.

TABLE 18

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

As for indication of a port group, in an implementation manner of the present exemplary embodiment, the receiving end obtains port group indication information according to RRC high-layer signaling. A corresponding relationship between a high-layer signaling value and a port group is as shown in Table 19.

TABLE 19

| High-layer signaling value | Port group |
|---|---|
| 0 | {7, 8} |
| 1 | {11, 13} |

As for indication of a port group, in another implementation manner of the present exemplary embodiment, the receiving end obtains port group indication information according to an NDI. Specifically, when there is a disabled codeword, the NDI of the disabled codeword indicates different port groups. And when there is not a disabled codeword, the NDI of a first enabled codeword indicates different port groups.

Herein, a mapping relationship between an NDI and a port group is as shown in Table 20.

TABLE 20

| NDI | Port group |
|---|---|
| 0 | {7, 8} |
| 1 | {11, 13} |

When a DMRS port group at a current subframe obtained by the receiving end is {7, 8}, a DMRS port indicated in Table 19 is a DMRS port for data demodulation at a current subframe of the receiving end.

When a DMRS port group at a current subframe obtained by the receiving end is {11, 13}, there are two processing situations as follows.

Situation 1 corresponds to an item in Table 18, which indicates layers of which the number is smaller than or equal to 2, DMRS ports indicated in Table 18 are replaced. That is, ports in a port group 1 indicated in Table 18 correspond to ports in a port group 2, and the ports in the port group 2 serve as DMRS ports for data demodulation at a current subframe of the receiving end. Specifically, a port 7 corresponds to a port 11, and a port 8 corresponds to a port 13.

Situation 2 corresponds to an item in Table 20, which indicates layers of which the number is greater than 2. And in this case, DMRS ports indicated in Table 18 are DMRS ports for data demodulation at a current subframe of the receiving end.

In an alternate exemplary embodiment, a sending end makes an appointment with a receiving end for N port groups. And the sending end indicates a port group which should be selected at a current subframe of the receiving end according to at least one of the following indication information:

RRC signaling; and
physical layer NDI.

The receiving end further determines a DMRS port for data demodulation at a current subframe according to DMRS port group information and in conjunction with in-group DMRS port index configuration information of physical layer signaling.

In the present exemplary embodiment, N=2, a port group 1 is DMRS ports {7, 8, 9, 10, 11, 12, 13, 14}, a port group 2 is DMRS ports {11, 13, 9, 10, 7, 12, 8, 14}. And a joint coding table of in-group port indexes, layers and scramblers in a DCI command is as shown in Table 21.

TABLE 21

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, first port, $n_{SCID} = 0$ | 0 | 2 layers, ports1~2, $n_{CID} = 0$ |
| 1 | 1 layer, first port, $n_{SCID} = 1$ | 1 | 2 layers, ports 1~2, $n_{SCID} = 1$ |
| 2 | 1 layer, second port, $n_{SCID} = 0$ | 2 | 3 layers, ports 1~3 |
| 3 | 1 layer, second port, $n_{SCID} = 1$ | 3 | 4 layers, ports 1~4 |
| 4 | 2 layers, ports 1~2 | 4 | 5 layers, ports 1~5 |
| 5 | 3 layers, ports1~3 | 5 | 6 layers, ports 1~6 |
| 6 | 4 layers, ports 1~4 | 6 | 7 layers, ports 1~7 |
| 7 | Reserved | 7 | 8 layers, ports 1~8 |

As for indication of a port group, in an implementation manner of the present exemplary embodiment, the receiving end obtains port group indication information according to RRC high-layer signaling. A corresponding relationship between a high-layer signaling value and a port group is as shown in Table 22.

TABLE 22

| High-layer signaling value | Port group |
|---|---|
| 0 | {7, 8, 9, 10, 11, 12, 13, 14} |
| 1 | {11, 13, 9, 10, 7, 12, 8, 14} |

As for indication of a port group, in another implementation manner of the present exemplary embodiment, the receiving end obtains port group indication information according to an NDI.

Specifically, when there is a disabled codeword, the NDI of the disabled codeword indicates different port groups. And when there is not a disabled codeword, the NDI of a first enabled codeword indicates different port groups.

Herein, a mapping relationship between an NDI and a port group is as shown in Table 23.

TABLE 23

| NDI | Port group |
|---|---|
| 0 | {7, 8, 9, 10, 11, 12, 13, 14} |
| 1 | {11, 13, 9, 10, 7, 12, 8, 14} |

The receiving end obtains DMRS port information for demodulation at a current subframe in conjunction with notification via a port group and port group index information in a DCI command. For example, the receiving end obtains a port group A, a port index in a DCI command is k, and a DMRS port for demodulation at a current subframe of the receiving end is A(k). Specifically, the receiving end obtains a port group {11, 13, 9, 10, 7, 12, 8, 14}, and obtains the value of a joint coding field of scramblers, in-group port indexes and layers in a DCI command, which is a value 3 corresponding to two codewords. That is, port indexes are 1 to 4 in case of four layers, so DMRS ports for demodulation at a current subframe of the receiving end are {11, 13, 9, 10}.

In an alternate exemplary embodiment, a base station notifies DMRS port allocation information and other M−1 pieces of information in M information joint coding manners, the other M−1 pieces of information at least including DMRS pilot scrambler configuration information, $n_{scid}$ information and layer indication information about a receiving end. When the number of layers is r (r=1, 2), the base station makes an appointment with the receiving end for N different DMRS port groups corresponding to N $n_{scid}$, and N $n_{scid}$ values are bound with N DMRS port groups during joint coding.

Specifically, in the present exemplary embodiment, M=3, N=1, referring to joint coding of DMRS ports of the receiving end, the number of PDSCH layers of the receiving end and scrambler $n_{scid}$ of DMRS ports of the receiving end, $n_{scid}$ is bound with a port group, and for example, a joint coding result is as shown in Table 24.

TABLE 24

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 11, $n_{SCID} = 1$ | 1 | 2 layers, ports 11, 13, $n_{SCID} = 1$ |
| 2 | 1 layer, port 8, $n_{SCID} = 0$ | 2 | 3 layers, ports 7-9 |
| 3 | 1 layer, port 13, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In this case, it is necessary to modify an existing initialization manner of generating a DMRS random sequence namely Formula (1) into Formula (2):

$$c_{init}=(\lfloor n_s/2 \rfloor+1) \cdot (2n_{ID}^{(nscid)}+1) \cdot 2^{16}+n_{scid} \quad (1)$$

$$c_{init}=(\lfloor n_s/2 \rfloor+1) \cdot (2n_{ID}^{(nscid)}+1) \cdot 2^{16} \quad (2)$$

In the above formulas, $n_s$ is a subframe number, $n_{ID}^{(nscid)}=n_{ID}^{DMRS,nscid}$, a DMRS random sequence is a Gold random sequence defined by a 31-bit binary initialization value. And a final DMRS is obtained by multiplying the generated DMRS random sequence, after QPSK modulation, by an Orthogonal Code (OCC). In this case, when $n_{ID}^{DMRS,0}$ of a terminal 1 and $n_{ID}^{DMRS,1}$ of a terminal 2 are the same (or $n_{ID}^{DMRS,1}$ of a terminal 1 and $n_{ID}^{DMRS,0}$ of a terminal 2 are the same). A port group may be dynamically indicated by $n_{scid}$ in DCI, so as to achieve DMRS orthogonality of the terminal 1 and the terminal 2.

In an alternate exemplary embodiment, a base station notifies DMRS port allocation information and other M−1 pieces of information in M information joint coding manners. The other M−1 pieces of information at least includes DMRS pilot scrambler configuration information, $n_{scid}$ information and layer indication information about a receiving end. When the number of layers is r (r=1, 2), the base station makes an appointment with the receiving end for N different DMRS port groups corresponding to N $n_{scid}$. N $n_{scid}$ values are bound with N DMRS port groups during joint coding.

A candidate value of $n_{ID}^{DMRS,f(nSCID)}$ is notified according to high-layer signaling. And different candidate values are configured for different number of codewords by high-layer signaling as shown in the following table.

TABLE 25

| | Single codeword | | Double codewords |
| --- | --- | --- | --- |
| VCID | Candidate value | VCID | Candidate value |
| 0 | X0 | 0 | Y0 |
| 1 | X1 | 1 | Y1 |

Specifically, a candidate value of $n_{ID}^{DMRS,f(nSCID)}$ is configured by high-layer signaling. But a high-layer configuration process does not know specific codewords during practical transmission. And a corresponding table is searched in a transmission process according to practical codewords to determine a virtual cell and a candidate value.

In an alternate exemplary embodiment, a base station notifies DMRS port allocation information and other M−1 pieces of information in M information joint coding manners. The other M−1 pieces of information at least includes DMRS pilot scrambler configuration information, $n_{scid}$ information and layer indication information about a receiving end. When the number of layers is r (r=1, 2), the base station and the receiving end makes an appointment for N different DMRS port groups corresponding to N $n_{scid}$. And N $n_{scid}$ values are bound with N DMRS port groups during joint coding.

Specifically, in the present exemplary embodiment, M=3, N=1, referring to joint coding of DMRS ports of the receiving end, the number of PDSCH layers of the receiving end and scrambler $n_{scid}$ of DMRS ports of the receiving end. $n_{scid}$ is bound with a port group, and for example, a joint coding result is as shown in Table 26.

TABLE 26

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 1 layer, port A(NDI), $n_{SCID}$ = 0 | 0 | 2 layers, ports C(0)-D(0), $n_{SCID}$ = 0 |
| 1 | 1 layer, port A(NDI), $n_{SCID}$ = 1 | 1 | 2 layers, ports C(1)-D(1), $n_{SCID}$ = 1 |
| 2 | 1 layer, port B(NDI), $n_{SCID}$ = 0 | 2 | 3 layers, ports 7-9 |
| 3 | 1 layer, port B(NDI), $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

When there is a disabled codeword, the NDI of the disabled codeword indicates different port groups.

When there is one codeword, a mapping relationship between an NDI and a port group is as shown in Table 27.

TABLE 27

| NDI | Port group {A(NDI), B(NDI)} |
| --- | --- |
| 0 | {7, 8} |
| 1 | {11, 13} |

When there is one codeword, a mapping relationship between an nSCID and a port group is as shown in Table 28.

TABLE 28

| nSCID | Port group {C(nSCID), D(nSCID)} |
| --- | --- |
| 0 | {7, 8} |
| 1 | {11, 13} |

In this case, it is necessary to modify an existing initialization manner of generating a DMRS random sequence namely Formula (1) into Formula (2):

$$c_{init} = \left(\left\lfloor \frac{n_s}{2} \right\rfloor + 1\right) \cdot \left(2n_{ID}^{(nSCID)} + 1\right) \cdot 2^{16} + n_{SCID} \quad (1)$$

$$c_{init} = \left(\left\lfloor \frac{n_s}{2} \right\rfloor + 1\right) \cdot \left(2n_{ID}^{f(nSCID)} + 1\right) \cdot 2^{16} + g(n_{SCID}) \quad (2)$$

In the above-mentioned formulas, $n_s$ is a subframe number, $n_{ID}^{f(nSCID)} = n_{ID}^{DMRS,f(nSCID)}$, $f(n_{scid}) \in \{0,1\}$, $(n_{scid}) \in \{0,1\}$, $n_{scid} \in \{0,1\}$, and $n_{ID}^{DMRS,f(nSCID)}$ is a virtual cell ID of a terminal for DMRS demodulation.

When there are two codewords, with reference to at least one of a configuration of current transmission codeword and high-layer signaling, $f(n_{SCID})$ of $c_{init}$ may be modified into:

$$f(n_{SCID}) = xor(f(n_{SCID}), 1).$$

When there are two codewords and high-layer signaling configuration is enabled, with reference to at least one of a configuration of current transmission codeword and high-layer signaling configuration, $g(n_{SCID})$ of $c_{init}$ may be modified into:

$$g(n_{SCID}) = 0,$$

And $n_s$ is a subframe number, $n_{ID}^{(nscid)} = n_{ID}^{DMRS,nscid}$, a DMRS random sequence is a Gold random sequence defined by a 31-bit binary initialization value. And a final DMRS is obtained by multiplying the generated DMRS random sequence, after QPSK modulation, by an Orthogonal Code (OCC). In this case, when $n_{ID}^{DMRS,0}$ of a terminal 1 and $n_{ID}^{DMRS,1}$ of a terminal 2 are the same (or $n_{ID}^{DMRS,1}$ of a terminal 1 and $n_{ID}^{DMRS,0}$ of a terminal 2 are the same), a port group can be dynamically indicated by $n_{scid}$ in DCI, so as to achieve DMRS orthogonality of the terminal 1 and the terminal 2.

In an exemplary embodiment, a certain transmission process is double-codeword transmission. And a mapping relationship between double codewords is searched according to high-layer configuration to determine a mapping relationship between a virtual cell and a candidate value.

In the above-mentioned exemplary embodiment, under the condition of no increment of the number of bits occupied by the joint coding field of layers, ports and scramblers, orthogonal DMRS ports for MU-MIMO transmission are increased, thereby increasing orthogonal DMRS ports for MU-MIMO transmission when the TM is not increased.

Even if it is necessary to increase the TM due to increment of other aspects, the number of bits occupied by a joint coding field of layers, ports and scramblers in the method according to the exemplary embodiment of the present disclosure may remain unchanged, so that DCI overheads are saved, or the number of bits occupied by a joint coding field is increased. By utilizing the above-mentioned exemplary embodiments, the number of orthogonal DMRS ports for MU-MIMO transmission can be greatly increased.

By utilizing the method according to the exemplary embodiments of the present disclosure, orthogonality of DMRS ports of more MU-MIMO receiving ends is implemented without increment of the number of bits of DCI2C and DCI2D, thereby supporting high-order MU-MIMO transmission without increment of the TM, improving system performance, and reducing terminal complexity.

Particularly, when the NDI indicates a port group or a mapping relationship, orthogonal indication is dynamic, and dynamic switching of MU-MIMO/SU-MIMO can be supported to the greatest extent.

Meanwhile, the method in the exemplary embodiments of the present disclosure may also be used for a future added DCI mode. In this case, by utilizing the method in the exemplary embodiment of the present disclosure, high-order MU-MIMO transmission can be supported whilst the number of bits of the added DCI mode can be reduced.

Meanwhile, when the existing information bit in DCI is reused in the exemplary embodiments of the present disclosure, it is fully considered to solve the problem of collision between two contents needing to be indicated by this information bit. One of the two contents represents an original indication content (such as RV, MCS, NDI, and process number) of the information bit, and the other content represents a mapping relationship indicated by the existing information bit.

According to the description of the above-mentioned implementation manner, a person skilled in the art may clearly know that the method according to the above-mentioned embodiments may be implemented according to software and a necessary general hardware platform, or may, certainly, be implemented by hardware. However, under many circumstances, the former is a exemplary implementation manner. Based on such understanding, the essence of the technical solutions of the present disclosure or parts contributing to the related art may be substantially embodied in a form of software product, and this computer software product is stored in a storage medium (such as a Read-Only Memory/Random Access Memory (ROM/RAM), a magnetic disk or an optical disk), which includes a plurality of instructions enabling terminal equipment (mobile phone, computer, server, network equipment or the like) to execute the method according to each embodiment of the present disclosure.

Each component may be implemented by software or hardware. Each component may be implemented by hardware in, but not limited to, the following manners: the components are located in the same processor respectively; or, the components are located in multiple processors respectively.

The embodiment of the present disclosure also provides a storage medium. Alternatively, in the present embodiment, the storage medium may be arranged to store program codes for executing the method steps according to the above-mentioned embodiment.

Alternatively, in the present embodiment, the storage medium may include, but not limited to, various media capable of storing program codes such as a U disk, an ROM, an RAM, a mobile hard disk, a magnetic disk or an optical disk.

Alternatively, in the present embodiment, the processor executes the method steps in the above-mentioned embodiment according to the program codes stored in the storage medium.

Alternatively, specific examples in the present embodiment may refer to examples described in the above-mentioned embodiment and alternative implementation manner. The present embodiment will not be elaborated herein.

Obviously, a person skilled in the art shall understand that all of the above-mentioned components or steps in the present disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices. Moreover, the shown or described steps may be executed in a sequence different from the sequence here under certain conditions. Or, they are manufactured into each integrated circuit component respectively, or multiple components or steps therein are manufactured into a single integrated circuit component. Thus, the present disclosure is not limited to a combination of any specific hardware and software.

The above are the exemplary embodiments of the present disclosure, and not intended to limit the present disclosure. As will occur to a person skilled in the art, the present disclosure is susceptible to various modifications and changes. Any modifications, equivalent replacements, improvements and the like made within the spirit and principle of the present disclosure shall fall within the scope of protection of the present disclosure.

INDUSTRIAL APPLICABILITY

The technical solutions of the above-mentioned embodiments of the present disclosure may be applied to notification and determination of a DMRS port or a mapping relationship. According to the embodiments of the present disclosure, a sending end sends indication information to a receiving end in a TM, and the sending end indicates allocation information about DMRS ports or a mapping relationship according to the indication information, and the indication information includes at least one of the following: RRC signaling, physical layer NDI bit, and DMRS pilot scrambler configuration information $n_{scid}$. The problem of influence on the performance of an MU-MIMO system caused by lower channel estimation performance due to limited orthogonal DMRS ports for MU-MIMO transmission and high MUI after increment of a total number of MU-MIMO transmission layers is solved. On the basis of saving signaling overheads, supporting dynamic switching of SU-MIMO/MU-MIMO and improving base station configuration flexibility during MU-MIMO transmission, the present disclosure increases orthogonal DMRS ports for MU-MIMO transmission, effectively inhibits MUI during channel estimation, improves channel estimation performance, and improves the performance of an MU-MIMO system.

What is claimed is:

1. A method for notifying DeModulation Reference Signal (DMRS) information, comprising:
   sending, by a sending end, indication information to a receiving end in a Transmission Mode (TM), wherein the indication information indicates a mapping relationship selected from a plurality of mapping relationships, the mapping relationship refers to a mapping relationship between a joint coding field value set and a joint coding content set, and the indication information comprises Radio Resource Control (RRC) signaling;
   wherein the joint coding content comprises the De Modulation Reference Signal (DMRS) port(s) information;
   wherein each of the plurality of mapping relationships comprises a number of DMRS port(s) of Physical Downlink Shared Channel (PDSCH) of the receiving end in a joint coding content, and the plurality of mapping relationships have the same minimum number of DMRS port(s) and the same maximum number of DMRS port(s).

2. The method as claimed in claim 1, further comprising:
when a number of bits required for indicating the mapping relationship is smaller than a number of bits in a bit field corresponding to the indication information, at least one Least Significant Bit (LSB) in the bit field is used for indicating the mapping relationship.

3. The method as claimed in claim 1, in the case of the indication information comprising a physical layer NDI bit, notifying different mapping relationships according to an NDI of a transmission block comprises:
when a disabled transmission block is in a Downlink Control Information (DCI) notification, indicating, by different NDI values of the disabled transmission block, different mapping relationships; and
when the disabled transmission block is not in the DCI notification, indicating different mapping relationships comprises one of the following: fixedly selecting a mapping relationship, selecting any one of N mapping relationships; indicating different mapping relationships by using an NDI of a first enabled transmission block; indicating different mapping relationships by using an NDI of a second enabled transmission block; and indicating different mapping relationships by using NDIs of all enabled transmission blocks jointly.

4. The method as claimed in claim 1, wherein joint coding of the joint coding field comprises one of the following:
joint coding containing the DMRS ports of the receiving end, the number of PDSCH layers of the receiving end and scramblers $n_{scid}$ of DMRS port(s) of the receiving end; and
joint coding containing DMRS port(s) of the receiving end, the number of PDSCH layers of the receiving end, scramblers $n_{scid}$ of DMRS port(s) of the receiving end and DMRS power of the receiving end.

5. The method as claimed in claim 4, wherein
when the joint coding contains the DMRS port(s) of the receiving end, the number of PDSCH layers of the receiving end and scramblers $n_{scid}$ of the DMRS port(s) of the receiving end, a joint coding content represents a combination of DMRS port values of the receiving end, the number of PDSCH layer values of the receiving end and scrambler $n_{scid}$ value(s) of the DMRS port(s) of the receiving end, and all possible combinations of the DMRS port(s) of the receiving end, the number of the PDSCH layers of the receiving end and the scramblers $n_{scid}$ of the DMRS ports of the receiving end form a joint coding content set; and
when joint coding contains the DMRS port(s) of the receiving end, the number of PDSCH layers of the receiving end, scramblers $n_{scid}$ of the DMRS port(s) of the receiving end and DMRS power of the receiving end, the joint coding content represents a combination of DMRS port values of the receiving end, the number of PDSCH layer values of the receiving end and scrambler $n_{scid}$ values of the DMRS port(s) of the receiving end, and all possible combinations of the DMRS port(s) of the receiving end, the number of the PDSCH layers of the receiving end, the scramblers $n_{scid}$ of the DMRS port(s) of the receiving end and the DMRS power of the receiving end form a joint coding content set.

6. The method as claimed in claim 1, wherein the mapping relationship between the joint coding field value set and the joint coding content set satisfies at least one of the following features:
different mapping relationships correspond to the same bit number of a joint coding field;
the same bit value of a joint coding field is regarded as two different values when corresponding to a transmission block and two transmission blocks;
mapping relationships are one-to-one correspondence mapping relationships, a joint coding field value set in one mapping relationship is a subset of the joint coding value set, and a coding content set in a mapping relationship is a subset of the coding content set;
joint coding contents represented by the same value of a joint coding field in different mapping relationships are the same or different;
different mapping relationships and a number of mapping relationships are pre-determined by the receiving end and the sending end; and
a corresponding relationship between mapping relationship indication information and the mapping relationships is pre-appointed by the receiving end and the sending end.

7. A method for determining De Modulation Reference Signal (DMRS) ports information, comprising:
receiving, by a receiving end, indication information sent by a sending end in a Transmission Mode (TM), and determining, by the receiving end according to the indication information, a mapping relationship selected from a plurality of mapping relationships, wherein the mapping relationship refers to a mapping relationship between a joint coding field value set and a joint coding content set, a joint coding content is obtained according to a value in the joint coding field in a DCI and with reference to the selected mapping relationship, and the indication information comprises Radio Resource Control (RRC) signaling;
wherein the joint coding content comprises the DMRS port(s) information;
wherein each of the plurality of mapping relationships comprises a number of DMRS port(s) of Physical Downlink Shared Channel (PDSCH) of the receiving end in a joint coding content, and the plurality of mapping relationships have the same minimum number of DMRS port(s) and the same maximum number of DMRS port(s).

8. The method as claimed in claim 7, further comprising:
making, by the receiving end, an appointment with the sending end for N DMRS port groups, wherein N>1, and N is a positive integer;
obtaining, by the receiving end, DMRS port groups information of the receiving end according to the RRC signaling:
after the receiving end obtains the DMRS port group information, determining, by the receiving end, the DMRS port(s) for data demodulation at the current time unit according to physical layer signaling about port allocation information in the DMRS port groups;
wherein an intersection between different port groups is empty.

9. The method as claimed in claim 8, wherein when one codeword is transmitted, different NDI values of disabled codewords indicate different DMRS port groups, and in this case, a number of DMRS port groups is equal to a number of different NDI values; and when two codewords are transmitted, different n_scid values in Downlink Control Information (DCI) indicate different DMRS port groups, and in this case, a number of DMRS port groups is equal to a number of different n_scid values.

10. The method as claimed in claim 7, further comprising:
when a number of bits required for indicating the mapping relationship is smaller than a number of bits in the bit field corresponding to the indication information, at least one Least Significant Bit (LSB) in the bit field is used for indicating the mapping relationship.

11. The method as claimed in claim 7, wherein joint coding of the joint coding field comprises one of the following:
joint coding containing the DMRS ports of the receiving end, the number of PDSCH layers of the receiving end and scramblers $n_{scid}$ of the DMRS port(s) of the receiving end; and
joint coding containing the DMRS port(s) of the receiving end, the number of PDSCH layers of the receiving end, scramblers $n_{scid}$ of the DMRS port(s) of the receiving end and DMRS power of the receiving end.

12. The method as claimed in claim 7, wherein
when joint coding contains the DMRS port(s) of the receiving end, the number of PDSCH layers of the receiving end and scramblers $n_{scid}$ of the DMRS port(s) of the receiving end, a joint coding content represents a combination of DMRS port values of the receiving end, the number of PDSCH layer values of the receiving end and scrambler $n_{scid}$ value(s) of the DMRS port(s) of the receiving end, and all possible combinations of the DMRS port(s) of the receiving end, the number of the PDSCH layers of the receiving end and the scramblers $n_{scid}$ of the DMRS port(s) of the receiving end form a joint coding content set; and
when joint coding contains the DMRS port(s) of the receiving end, the number of PDSCH layers of the receiving end, scramblers $n_{scid}$ of the DMRS port(s) of the receiving end and DMRS power of the receiving end, the joint coding content represents a combination of DMRS port values of the receiving end, the number of PDSCH layer values of the receiving end and scrambler $n_{scid}$ values of the DMRS port(s) of the receiving end, and all possible combinations of the DMRS port(s) of the receiving end, the number of the PDSCH layers of the receiving end, the scramblers $n_{scid}$ of the DMRS port(s) of the receiving end and the DMRS power of the receiving end form a joint coding content set.

13. The method as claimed in claim 7, wherein the mapping relationship between the joint coding field value set and the joint coding content set satisfies at least one of the following features:
different mapping relationships correspond to the same bit number of a joint coding field;
the same bit value of a joint coding field is regarded as two different values when corresponding to a transmission block and two transmission blocks;
mapping relationships are one-to-one correspondence mapping relationships, a joint coding field value set in one mapping relationship is a subset of the joint coding value set, and a coding content set in a mapping relationship is a subset of the coding content set;
joint coding contents represented by the same value of a joint coding field in different mapping relationships are the same or different;
different mapping relationships and a number of mapping relationships are pre-determined by the receiving end and the sending end; and a corresponding relationship between mapping relationship indication information and the mapping relationships is pre-appointed by the receiving end and the sending end.

14. The method as claimed in claim 7, wherein the indication information is used for indicating allocation information about DMRS port groups, different indication information values corresponds to different DMRS port groups, wherein N is a positive integer greater than 1.

15. The method as claimed in claim 14, wherein
receiving, by the receiving end, the indication information comprises: receiving, by the receiving end, physical layer port allocation signaling;
determining, by the receiving end, the DMRS port(s) according to the indication information comprises: determining, by the receiving end, the DMRS port according to physical layer port allocation signaling, wherein the physical layer port allocation signaling comprise port allocation information in the DMRS port groups.

16. The method as claimed in claim 7, wherein the method further comprises:
obtaining, by the receiving end, the joint coding content according to values in the joint coding field indicated by physical layer dynamic control signaling, and with reference to the mapping relationship; and,
obtaining, by the receiving end, the DMRS port(s) information according to the joint coding content.

17. A base station, comprising a hardware processor, and the hardware processor is configured to:
send a indication information to a receiving end in a Transmission Mode (TM), wherein the indication information indicates a mapping relationship selected from a plurality of mapping relationships, the mapping relationship refers to a mapping relationship between a joint coding field value set and a joint coding content set, and the indication information comprises Radio Resource Control (RRC) signaling
wherein the joint coding content comprises the DMRS port(s) information;
wherein each of the plurality of mapping relationships comprises a number of DMRS port(s) of PDSCH of the receiving end in a joint coding content, and the plurality of mapping relationships have the same minimum number of DMRS port(s) and the same maximum number of DMRS port(s).

18. A User Equipment (UE), comprising:
a second receiving component, arranged to receive a indication information sent by a sending end in a Transmission Mode (TM), and determine, according to the indication information, a mapping relationship from a plurality of mapping relationships, wherein the mapping relationship refers to a mapping relationship between a joint coding field value set and a joint coding content set, a joint coding content is obtained according to values in the joint coding field and with reference to the mapping relationship, and the indication information comprises Radio Resource Control (RRC) signaling;
wherein the joint coding content comprises DMRS port(s) information;
wherein each of the plurality of mapping relationships comprises a number of DMRS port(s) of PDSCH of the receiving end in a joint coding content, and the plurality of mapping relationships have the same minimum number of DMRS port(s) and the same maximum number of DMRS port(s).

* * * * *

UNITED STATES PATENT AND TRADEMARK OFFICE
CERTIFICATE OF CORRECTION

PATENT NO. : 10,841,058 B2
APPLICATION NO. : 15/752477
DATED : November 17, 2020
INVENTOR(S) : Shujuan Zhang et al.

Page 1 of 1

It is certified that error appears in the above-identified patent and that said Letters Patent is hereby corrected as shown below:

In the Claims

Column 37, Line 36, in Claim 4, insert --the-- before "DMRS port(s)";
Column 38, Line 14, in Claim 6, insert --joint-- before "coding content set";
Column 39, Line 61, in Claim 13, insert --joint-- before "coding content set";
Column 40, Line 16, in Claim 15, replace "port" with "port(s)";
Column 40, Line 50, in Claim 18, replace "a", second occurrence, with "an"; and
Column 40, Line 66, in Claim 18, replace "the" with "a".

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*